United States Patent
Nagai et al.

(10) Patent No.: US 9,138,893 B2
(45) Date of Patent: Sep. 22, 2015

(54) ROBOT TEACHING SYSTEM, ROBOT TEACHING ASSISTANT DEVICE, ROBOT TEACHING METHOD, AND COMPUTER-READABLE RECORDING MEDIUM

(71) Applicant: KABUSHIKI KAISHA YASKAWA DENKI, Kitakyushu-shi (JP)

(72) Inventors: Ryoichi Nagai, Fukuoka (JP); Yukio Hashiguchi, Fukuoka (JP); Tetsuro Izumi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 22 days.

(21) Appl. No.: 14/140,520

(22) Filed: Dec. 25, 2013

(65) Prior Publication Data
US 2014/0188281 A1    Jul. 3, 2014

(30) Foreign Application Priority Data

Dec. 28, 2012   (JP) .................................. 2012-288270
Jun. 4, 2013    (JP) .................................. 2013-117904

(51) Int. Cl.
| | |
|---|---|
| *B25J 13/08* | (2006.01) |
| *G05B 19/04* | (2006.01) |
| *B25J 9/00* | (2006.01) |
| *G05B 19/425* | (2006.01) |

(52) U.S. Cl.
CPC ............. *B25J 9/0081* (2013.01); *G05B 19/425* (2013.01)

(58) Field of Classification Search
USPC ............ 700/254, 245, 264, 258, 257; 901/31, 901/30, 3
See application file for complete search history.

(56) References Cited

U.S. PATENT DOCUMENTS

| | | | |
|---|---|---|---|
| 2006/0178778 A1* | 8/2006 | Fuhlbrigge et al. ........... | 700/264 |
| 2010/0286826 A1* | 11/2010 | Tsusaka et al. ............... | 700/254 |
| 2011/0190932 A1* | 8/2011 | Tsusaka et al. ............... | 700/254 |
| 2011/0208355 A1* | 8/2011 | Tsusaka ........................ | 700/246 |

(Continued)

FOREIGN PATENT DOCUMENTS

| | | |
|---|---|---|
| JP | 04-289089 | 10/1992 |
| JP | 05-293782 | 11/1993 |

(Continued)

OTHER PUBLICATIONS

Japanese Office Action for corresponding JP Application No. 2012-288270, Jan. 7, 2014.

(Continued)

*Primary Examiner* — Ronnie Mancho
(74) *Attorney, Agent, or Firm* — Mori & Ward, LLP

(57) ABSTRACT

A robot teaching system according to an embodiment includes a robot, a sensor, a screen generator, an adjuster, and a job generator. The sensor measures measured values relating to operations of the robot. The screen generator generates a teaching operation screen that includes guidance information intended for the teacher. The adjuster adjusts parameters for generating a job based on specified values relating to the operations of the robot and input in the teaching operation screen, and the measured values of the sensor associated with the specified values, the parameters defining an operation command including corrections of the operations of the robot. The job generator generates the job in which the parameters adjusted by the adjuster are incorporated.

19 Claims, 19 Drawing Sheets

(56) References Cited

U.S. PATENT DOCUMENTS

2011/0288667 A1* 11/2011 Noda et al. ............... 700/98
2012/0143371 A1* 6/2012 Selnes et al. ............ 700/254

FOREIGN PATENT DOCUMENTS

| JP | 08-118278 | 5/1996 |
|---|---|---|
| JP | 2002-154085 | 5/2002 |
| JP | 2002-355782 | 12/2002 |
| JP | 2007-136588 | 6/2007 |
| JP | 2009-297877 | 12/2009 |
| JP | 2010-214573 | 9/2010 |
| JP | 2011-110630 | 6/2011 |
| JP | 2011-224696 | 11/2011 |
| JP | 2012-137421 | 7/2012 |
| JP | 2012-232384 | 11/2012 |

OTHER PUBLICATIONS

Japanese Office Action for corresponding JP Application No. 2012-288270, Mar. 18, 2014.

Japanese Decision to Dismiss the Amendment for corresponding JP Application No. 2012-288270, Jul. 15, 2014.

Japanese Office Action for corresponding JP Application No. 2013-117904, Apr. 28, 2015.

Chinese Office Action for corresponding CN Application No. 201310739513.X, Jun. 26, 2015.

* cited by examiner

<CONTACT OPERATION>

<GROPING OPERATION>

<INSERTION OPERATION>

ROBOT TEACHING SYSTEM, ROBOT TEACHING ASSISTANT DEVICE, ROBOT TEACHING METHOD, AND COMPUTER-READABLE RECORDING MEDIUM

CROSS-REFERENCE TO RELATED APPLICATIONS

This application is based upon and claims the benefit of priority of the prior Japanese Patent Application No. 2012-288270, filed on Dec. 28, 2012; and Japanese Patent Application No. 2013-117904, filed on Jun. 4, 2013, the entire contents of both of which are incorporated herein by reference.

FIELD

The embodiments discussed herein are directed to robot teaching systems, robot teaching assistant devices, and robot teaching methods.

BACKGROUND

Japanese Patent Application Laid-open No. 2007-136588 discloses a teaching method using a portable dedicated device commonly called a programming pendant that is operated by a teacher to move the robot through steps one after another to thereby perform teaching.

SUMMARY

A robot teaching system according to an embodiment includes a robot, a sensor, a screen generator, an adjuster, and a job generator. The sensor measures measured values relating to operations of the robot. The screen generator generates a teaching operation screen that includes guidance information intended for the teacher. The adjuster adjusts parameters for defining an operation command including corrections of the operations of the robot and for generating a job based on specified values relating to the operations of the robot and input in the teaching operation screen, and the measured values of the sensor associated with the specified values. The job generator generates the job in which the parameters adjusted by the adjuster are incorporated.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Embodiments of robot teaching systems, robot teaching assistant devices, robot teaching methods, and computer-readable recording medium disclosed in this application will be described in detail below with reference to the accompanying drawings. The embodiments given hereunder are not intended to limit the invention.

In the following, a case will be exemplarily described in which specific contents of work to be taught to a robot is concerned with fitting work involving workpieces being fitted with each other. Additionally, an end effector will hereunder be referred to as a "hand". A programming pendant may be referred to as a "PP".

First Embodiment

Figure 1:
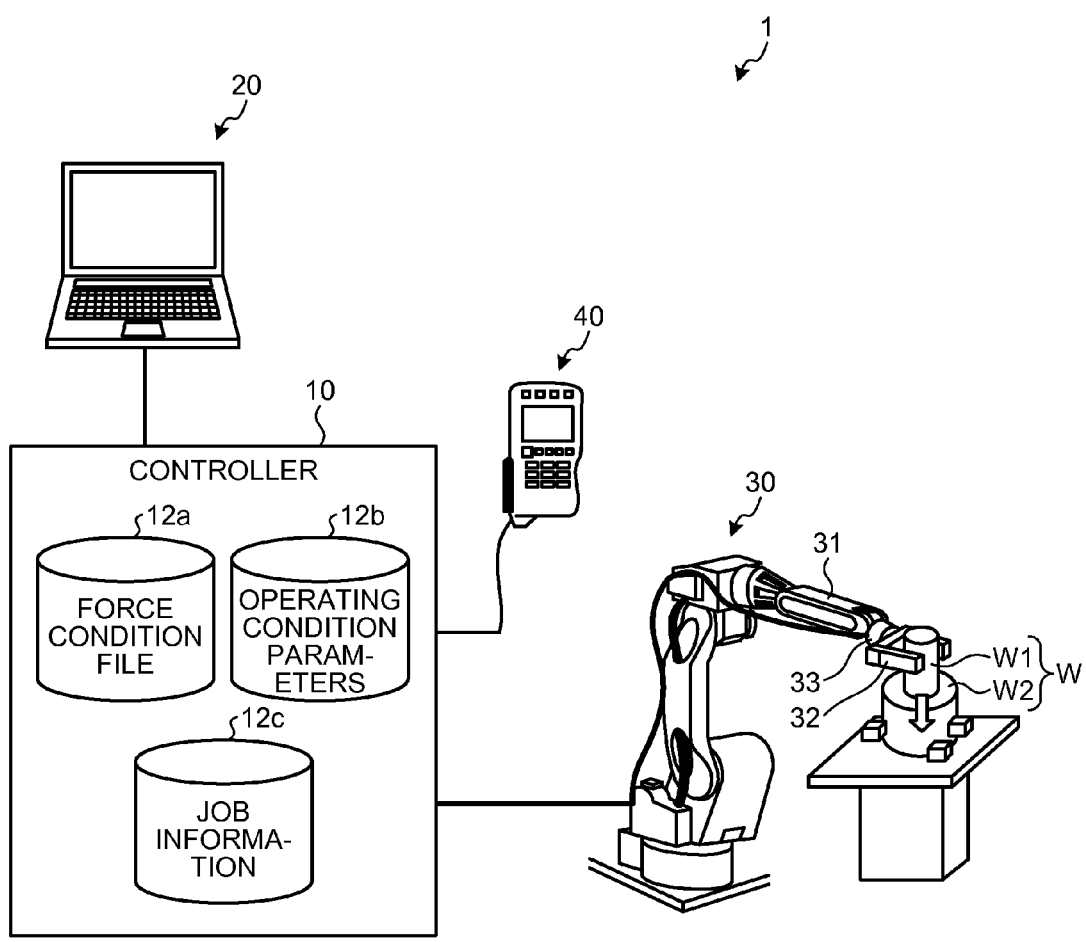
FIG. 1 is a schematic diagram illustrating a general configuration of a robot teaching system according to a first embodiment.

FIG. 1 is a schematic diagram illustrating a general configuration of a robot teaching system 1 according to a first embodiment. As illustrated in FIG. 1, the robot teaching system 1 includes a controller 10, a personal computer (PC) 20, a robot 30, and a programming pendant 40.

The controller 10 includes an arithmetic processing unit and a storage unit. The controller 10 will be described in detail later with reference to FIG. 2.

The controller 10 is connected to various devices including the PC 20, the robot 30, and the programming pendant 40 that make up the robot teaching system 1 in a manner of being capable of transmitting information. The style of connection does not matter, whether it is a wired or wireless connection.

The controller 10 has a force condition file 12a, operating condition parameters 12b, and job information 12c. The force condition file 12a represents information that includes force control parameters used for force control to be described later. The operating condition parameters 12b represent information that includes parameters used in each of the specific operations of a "contact operation", a "groping operation", and an "insertion operation" that constitute the fitting work. Each of these operations will be described in detail later with reference to, for example, FIGS. 3A to 3C. The job information 12c represents information that includes jobs generated as teaching results. A job is a program that defines operation commands for a device, such as the robot 30, controlled by the controller 10. As will be described later, the controller 10 interprets and performs the job, which causes the robot 30 and a hand 32 to be operated.

FIG. 1 illustrates the controller 10 in a single housing. This is, however, not the only possible configuration. Alternatively, the robot teaching system 1 may include a plurality of housings of controllers, each of the controllers being associated with a specific type of device to be controlled thereby and being connected with each other in a manner of being capable of mutually transmitting information.

The PC 20 is a terminal device that provides a monitor display of, for example, teaching operations, forces, positions, and statuses. Although the first embodiment exemplifies the PC 20, any other device, for example, a tablet terminal may be used as long as such a device can display various types of information including operations performed by a teacher.

The robot 30 includes an arm 31, the hand 32, and a force sensor 33. The arm 31 includes a plurality of structural members and a plurality of joints that include servomotors for moving the structural members. The hand 32 is an end effector mounted at a terminal moving part of the arm 31.

The force sensor 33 is an inner force sensor disposed between the arm 31 and the hand 32, specifically, on a wrist of the robot 30. Preferably, the force sensor 33 is a six-axis sensor capable of measuring forces and torsion in three directions in three dimensions. In the following, a value measured and output by the force sensor 33 may be referred to collectively as a "measured value". The force sensor 33 is an example of a measuring means.

The programming pendant 40 functions as a terminal for operating the robot 30 as necessary. The "fitting work" in the first embodiment is, as illustrated in FIG. 1, that the robot 30 holds with the hand 32 a male workpiece W1 (a first workpiece) and fits the workpiece W1 in a female workpiece W2 (a second workpiece). Additionally, the workpiece W1 and the workpiece W2 is collectively referred to as a workpiece W in the following.

Although FIG. 1 illustrates an exemplary single-arm robot having one arm, the number of arms does not matter and the robot applied to the robot teaching system 1 may be a multiple-arm robot having two or more arms.

Figure 2:
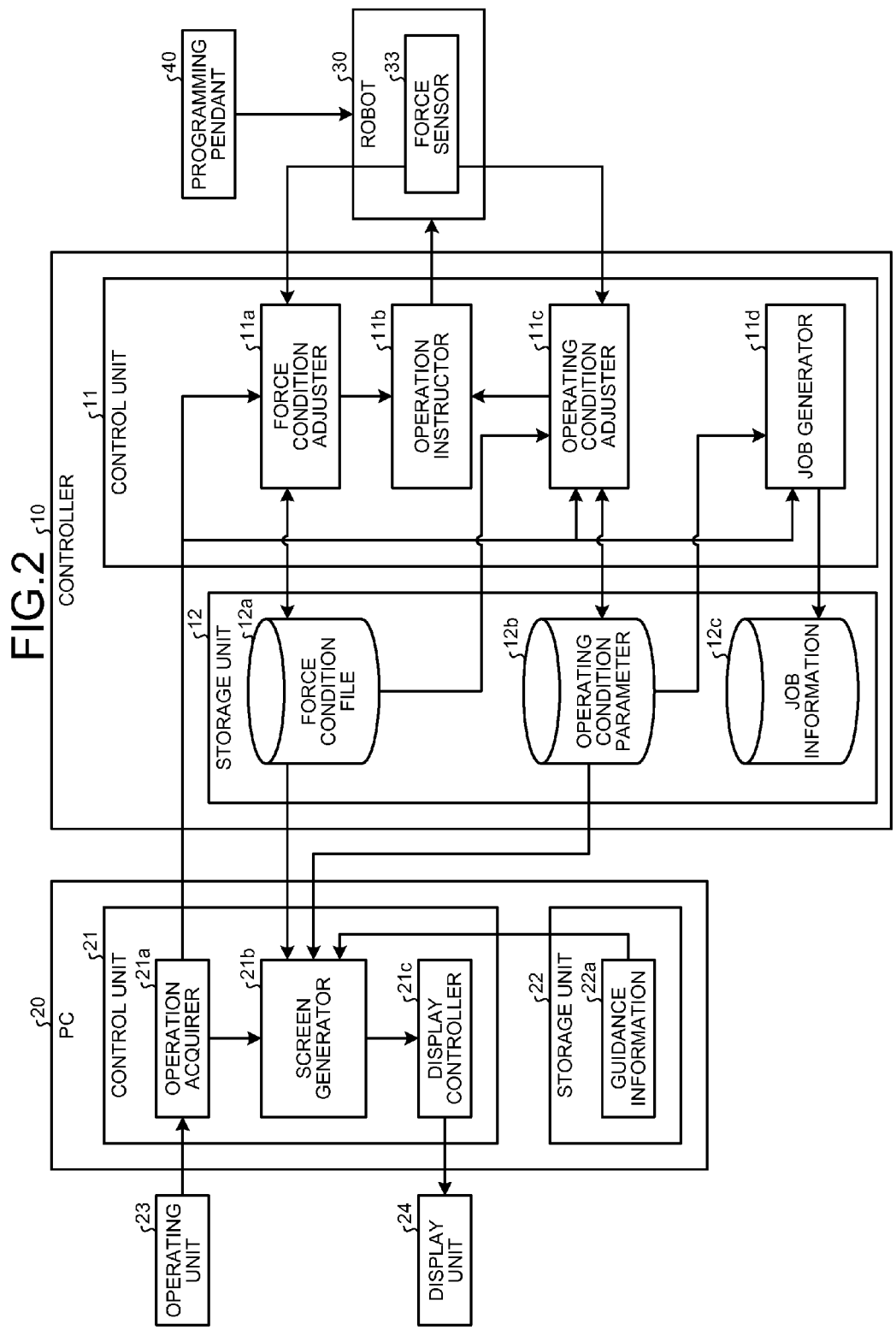
FIG. 2 is a block diagram illustrating the robot teaching system according to the first embodiment.

The following describes the configuration of the robot teaching system 1 according to the first embodiment with reference to FIG. 2. FIG. 2 is a block diagram illustrating the robot teaching system 1 according to the first embodiment. FIG. 2 illustrates only those elements that are required for describing the robot teaching system 1 and omits general elements included therein.

The controller 10 will first be described. As illustrated in FIG. 2, the controller 10 includes a control unit 11 and a storage unit 12. The control unit 11 includes a force condition adjuster 11a, an operation instructor 11b, an operating condition adjuster 11c, and a job generator 11d.

The force condition adjuster 11a and the operating condition adjuster 11c are an example of an adjusting means. The force condition adjuster 11a is an exemplary first adjuster in the first embodiment and the operating condition adjuster 11c is an exemplary second adjuster in the first embodiment.

The storage unit 12 is a storage device, such as a hard disk drive and a nonvolatile memory. The storage unit 12 stores therein the force condition file 12a, the operating condition parameters 12b, and the job information 12c.

The control unit 11 performs general control of the controller 10. Based on an operation of the teacher acquired by an operation acquirer 21a of the PC 20, the force condition adjuster 11a performs a force condition adjusting process for adjusting the force control parameters registered in the force condition file 12a in advance.

The force condition file 12a includes as a default job a job for moving the robot 30 in the force condition adjusting process performed by the force condition adjuster 11a. The force condition adjuster 11a notifies the operation instructor 11b of such a default job. The operation instructor 11b then interprets information included in the default job and generates an operation command for each joint (servomotor) of the robot 30, thereby operating the robot 30.

It is noted that the programming pendant 40 is used in, for example, preparatory operations, such as bringing a control point to a reference position, before attempting to operate the robot 30. These preparatory operations may be included in the default job.

The force condition adjuster 11a acquires from the force sensor 33 force feedback values obtained through such an operation of the robot 30 and adjusts the force control parameters of the force condition file 12a based on the force feedback values.

The operation instructor 11b operates the robot 30 based on the default job notified by the force condition adjuster 11a. The operation instructor 11b operates the robot 30 based also on a notification received from the operating condition adjuster 11c to be described later.

Based on the operation of the teacher acquired by the operation acquirer 21a of the PC 20 and the force control parameters adjusted by the force condition adjuster 11a, the operating condition adjuster 11c performs an operating condition adjusting process for adjusting the operating condition parameters 12b that define operating conditions in each of the "contact operation", the "groping operation", and the "insertion operation" that constitute the fitting work as described earlier.

Figure 3A:
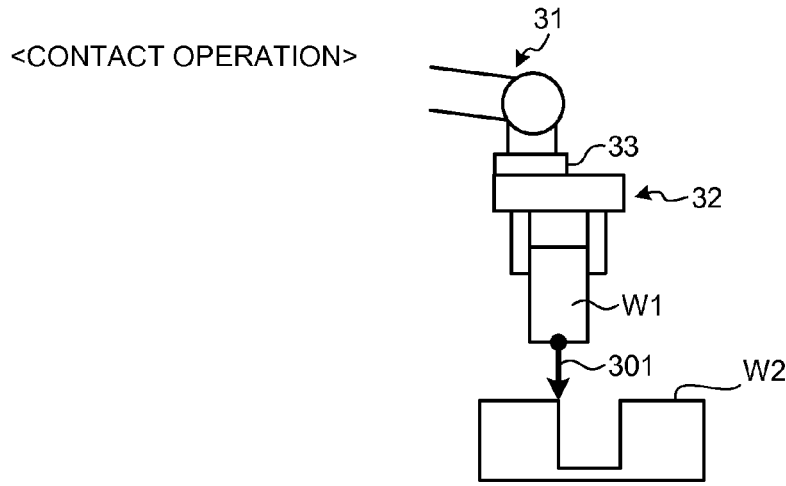
FIGS. 3A to 3C are schematic diagrams (part 1) to (part 3) illustrating the different types of operations that constitute fitting work.
Figure 3B:
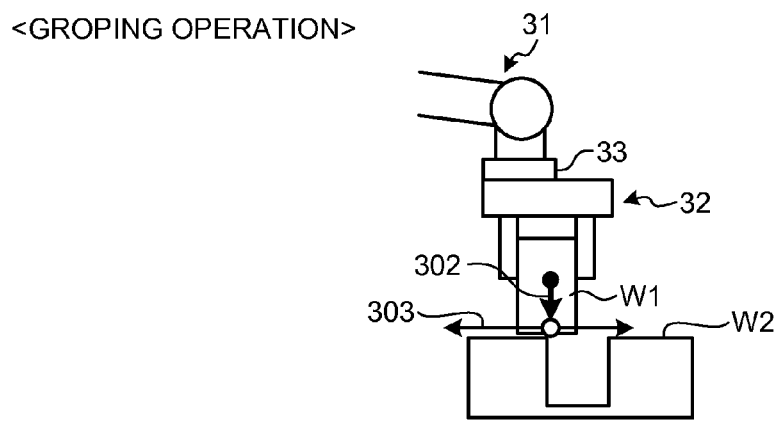
Figure 3C:
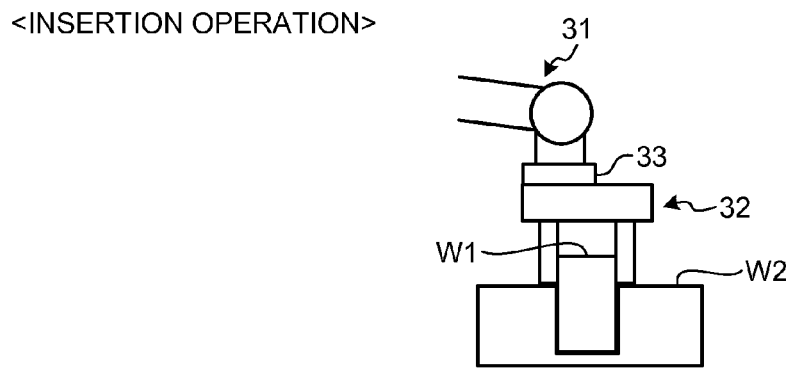

FIGS. 3A to 3C schematically illustrate the "contact operation", the "groping operation", and the "insertion operation" that constitute the fitting work. FIGS. 3A to 3C are schematic diagrams (part 1) to (part 3) illustrating these different types of operations that constitute the fitting work. As illustrated in FIG. 3A, the "contact operation" is to cause the workpiece W1 held in the hand 32 to touch the workpiece W2 at a position at which the workpiece W1 does not fit into a hole in the workpiece W2 (see an arrow 301 in FIG. 3A). A contact distance to be described later is thereby acquired.

As illustrated in FIG. 3B, the "groping operation" is to oscillate the workpiece W1 in an area around the hole in the workpiece W2 (see an arrow 303 in FIG. 3B), while keeping the workpiece W1 in contact with the workpiece W2 (see an arrow 302 in FIG. 3B). A groping cycle to be described later is thereby acquired.

As illustrated in FIG. 3C, the "insertion operation" is to insert the workpiece W1 into the hole in the workpiece W2. Upper and lower limit threshold values of an insertion amount to be described later are thereby acquired.

The robot teaching system 1 according to the first embodiment divides the fitting work into the three steps illustrated in FIGS. 3A to 3C and adjusts the operating condition parameters 12b individually, thereby enabling the fitting work to be taught to the robot 30 accurately.

The operating condition adjuster 11c causes the robot 30 to perform each of the "contact operation", the "groping operation", and the "insertion operation" via the operation instructor 11b and acquires the force feedback values thereby obtained from the force sensor 33.

The operating condition parameters 12b include a default operating condition of each of the "contact operation", the "groping operation", and the "insertion operation" as a default parameter and the operating condition adjuster 11c notifies the operation instructor 11b of the default parameter to thereby cause the operation instructor 11b to operate the robot 30.

The operating condition adjuster 11c adjusts the operating condition parameters 12b based on the acquired force feedback values. In this process, the acquired force feedback values and status transitions are given in sequence as a monitor display on the PC 20 side.

The teacher is allowed to input readjusted values based on the result of the monitor display. If a readjusted value is input by the teacher, the operating condition adjuster 11c acquires the readjusted value via the operation acquirer 21a of the PC 20 and operates the robot 30 accordingly.

The operating condition parameters 12b are then readjusted based on the force feedback values. The operating condition parameters 12b are optimized through the foregoing steps repeatedly performed.

Figure 4A:
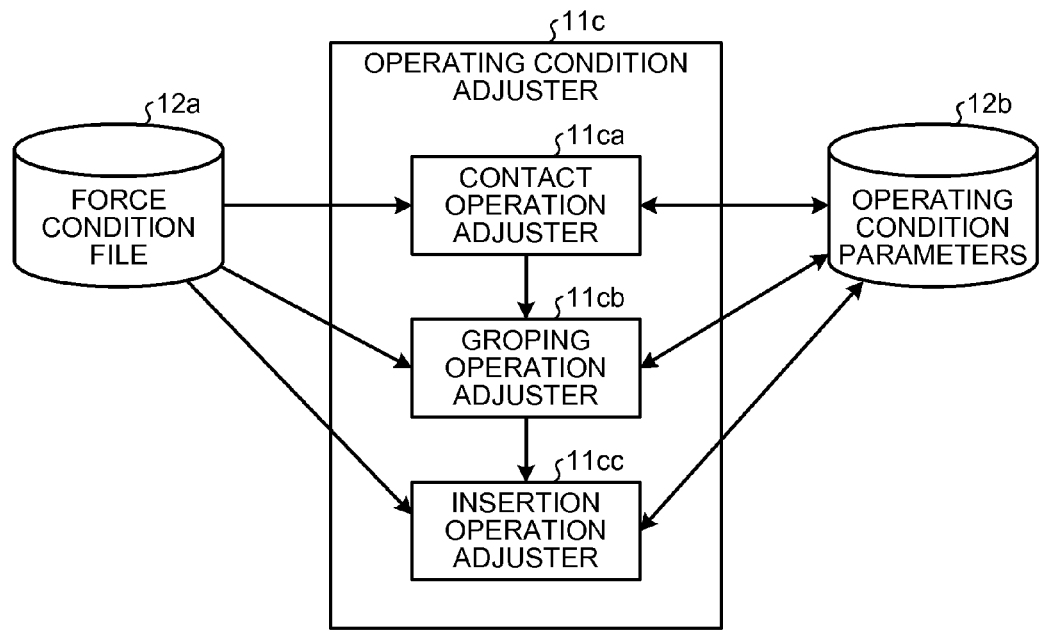
FIGS. 4A to 4B are block diagrams (part 1) and (part 2) illustrating an operating condition adjuster.
Figure 4B:
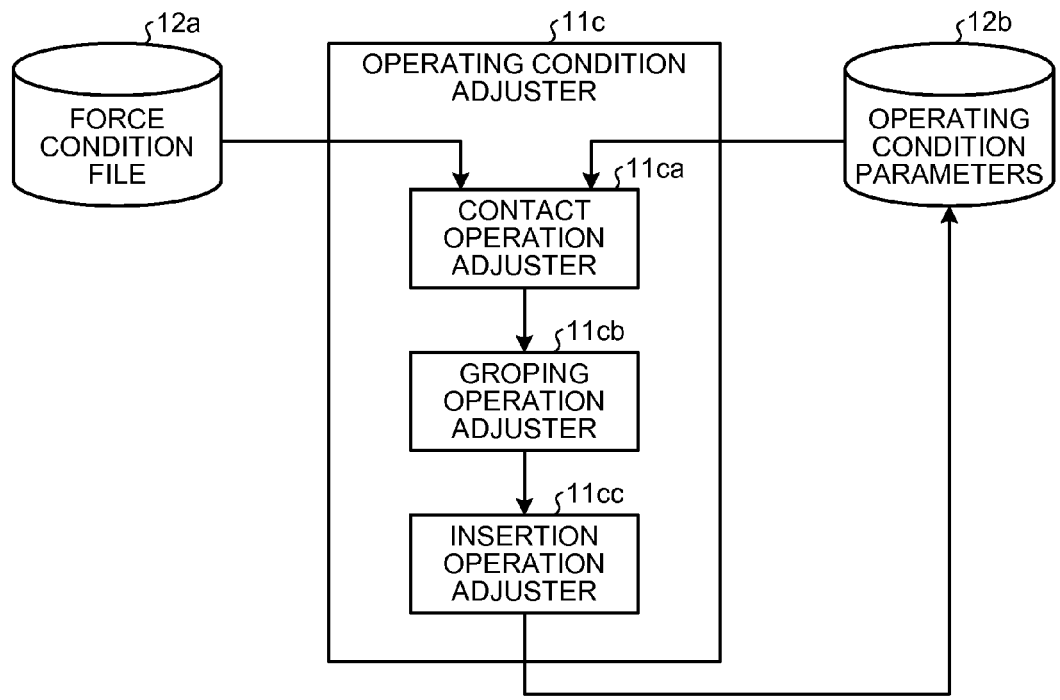

Block diagrams of the operating condition adjuster 11c are illustrated in FIGS. 4A and 4B. FIGS. 4A to 4B are block diagrams (part 1) and (part 2) illustrating the operating condition adjuster 11c.

As illustrated in FIGS. 4A and 4B, the operating condition adjuster 11c includes a contact operation adjuster 11ca, a groping operation adjuster 11cb, and an insertion operation adjuster 11cc. The contact operation adjuster 11ca adjusts the operating condition parameters 12b relating to the abovementioned "contact operation".

The groping operation adjuster 11cb adjusts the operating condition parameters 12b relating to the abovementioned "groping operation". The insertion operation adjuster 11cc adjusts the operating condition parameters 12b relating to the abovementioned "insertion operation".

It is noted that, as illustrated in FIG. 4A, each of the contact operation adjuster 11ca, the groping operation adjuster 11cb, and the insertion operation adjuster 11cc may individually input a force control parameter from the force condition file 12a to thereby adjust individually a corresponding one of the operating condition parameters 12b. This approach has an advantage of making a precise adjustment accurately for each process.

Additionally, as illustrated in FIG. 4B, the force control parameters of the force condition file 12a and the operating condition parameters 12b may be carried forward in sequence from the contact operation adjuster 11ca and the insertion operation adjuster 11cc may eventually update the operating condition parameters 12b.

This approach has an advantage that adjustments in three steps can be made automatically as a series of operations, contributing to making the teaching more efficient.

Operating steps relating to the operating condition adjusting process will be described later with reference to FIGS. 7A to 10B.

Referring back to FIG. 2, the job generator 11d will be described below. The job generator 11d performs, based on the operation of the teacher acquired by the operation acquirer 21a of the PC 20, a process of generating the job information 12c in which the operating condition parameters 12b after the adjustments are reflected. Specifically, the job generator 11d generates the job information 12c with adjusted parameters for generating a job, the parameters defining an operation command including specific contents of corrections to be made in the operation of the robot 30, based on a specified value in the operation of the teacher and the measured value of the force sensor 33. The job generator 11d is an example of a job generating means.

The following describes the PC 20. The PC 20 includes a control unit 21 and a storage unit 22. The PC 20 further externally includes an operating unit 23 and a display unit 24.

The control unit 21 includes the operation acquirer 21a, a screen generator 21b, and a display controller 21c. The storage unit 22 is a storage device, such as a hard disk drive and a nonvolatile memory. The storage unit 22 stores therein guidance information 22a.

The control unit 21 performs general control of the PC 20. The operation acquirer 21a acquires the operation of the teacher from the operating unit 23, which is an operating device such as a keyboard and a mouse. The operation acquirer 21a notifies specific contents of the operation to the screen generator 21b and the force condition adjuster 11a, the operating condition adjuster 11c, and the job generator 11d of the controller 10.

The screen generator 21b generates a display screen for teaching support according to the notified specific contents of the operation. In this process, the screen generator 21b generates a display screen in which, for example, the latest conditions of the force condition file 12a and the operating condition parameters 12b and a guidance message for the teacher included in the guidance information 22a are incorporated as appropriate. The screen generator 21b is an example of a screen generating means.

In addition, the screen generator 21b delivers the generated display screen to the display controller 21c. The display controller 21c displays the received display screen on the display unit 24 as a display device, such as a display, as appropriate.

The following describes the force condition adjusting process in detail. Specific contents of the force condition adjusting process will first be described with reference to FIGS. 5A to 5D, followed by exemplary specific operating steps with reference to FIGS. 6A and 6B.

Figure 5A:
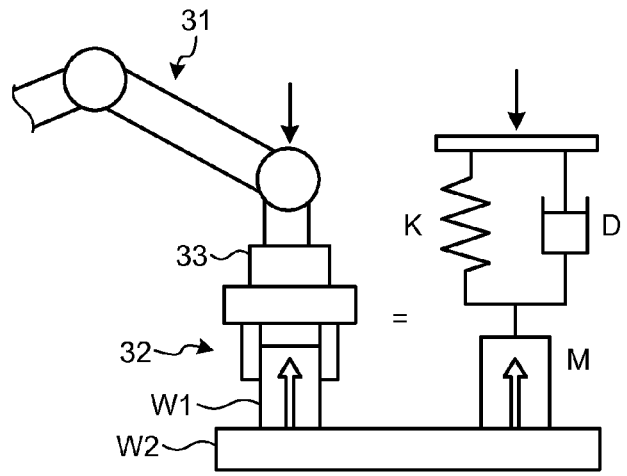
FIGS. 5A to 5D are diagrams (part 1) to (part 4) illustrating a force condition adjusting process.

FIGS. 5A to 5D are diagrams (part 1) to (part 4) illustrating the force condition adjusting process. FIGS. 6A and 6B are schematic diagrams (part 1) and (part 2) illustrating exemplary operating steps of the force condition adjusting process.

The force condition adjusting process according to the first embodiment uses impedance control given in expression (1) given below as a force control model.

Expression 1

$$M\Delta\ddot{x}+D\Delta\dot{x}\text{Viscosity}+K\Delta x=F_{ref}-F_{fb} \quad (1)$$

$F_{ref}$[N, Nm]: Force command value
$F_{fb}$[N, Nm]: Force feedback value
M[kg, kgm2]: Inertia coefficient
D[Ns/m, Nms]: Viscosity coefficient
K[N/m, Nm]: Spring coefficient The impedance control parameters, specifically, the force control parameters include an inertia coefficient M, a viscosity coefficient D, and a spring coefficient K, as illustrated in FIG. 5A. In the force condition adjusting process, the inertia coefficient M and the spring coefficient K are fixed.

Specifically, in the force condition adjusting process, the viscosity coefficient D is automatically adjusted so as to quickly follow a constant force command that may be given. Of the units indicated in the square brackets in the expression (1) above, the first one indicates a translation direction and the second one indicates a rotating direction.

The force condition adjusting process includes a first adjusting step and a second adjusting step. In the first adjusting step, the workpiece W1 is touched up against the workpiece W2 with a slight force for a predetermined period of time to thereby find a viscosity limit value with which contact stability can be maintained with no dispersion.

Figure 5B:
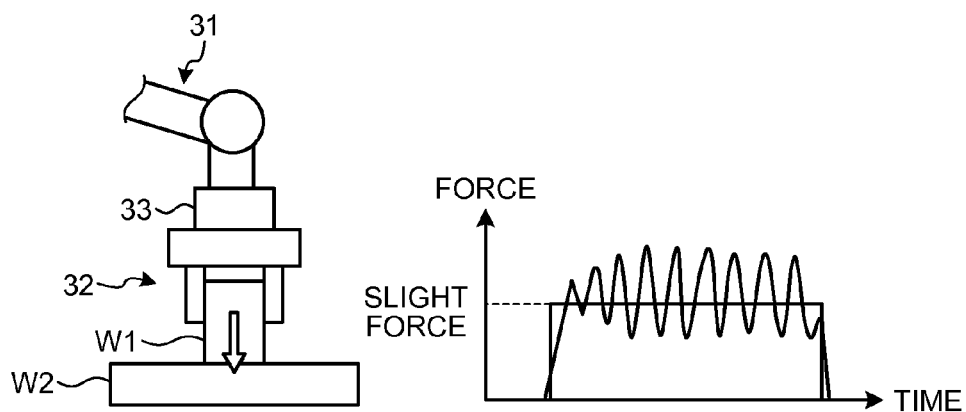
Figure 5C:
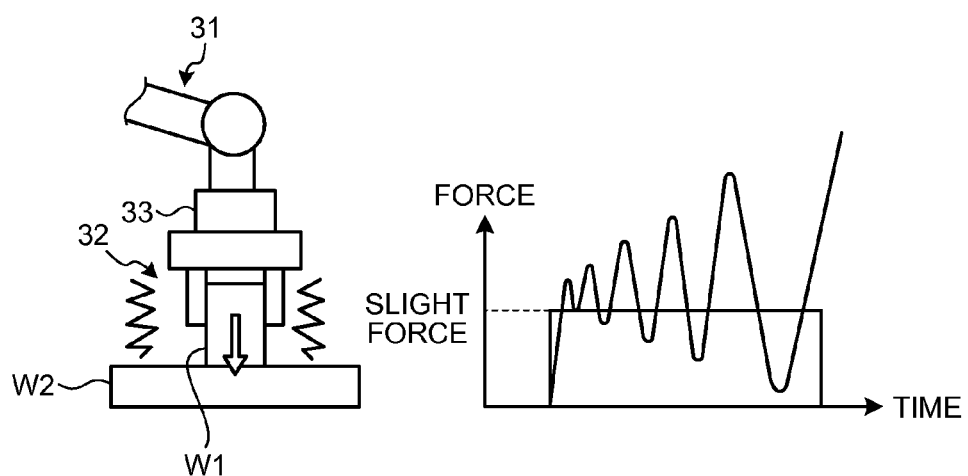
Figure 6A:
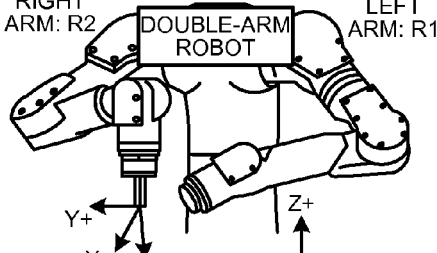
FIGS. 6A and 6B are schematic diagrams (part 1) and (part 2) illustrating exemplary operating steps of the force condition adjusting process.
Figure 6B:
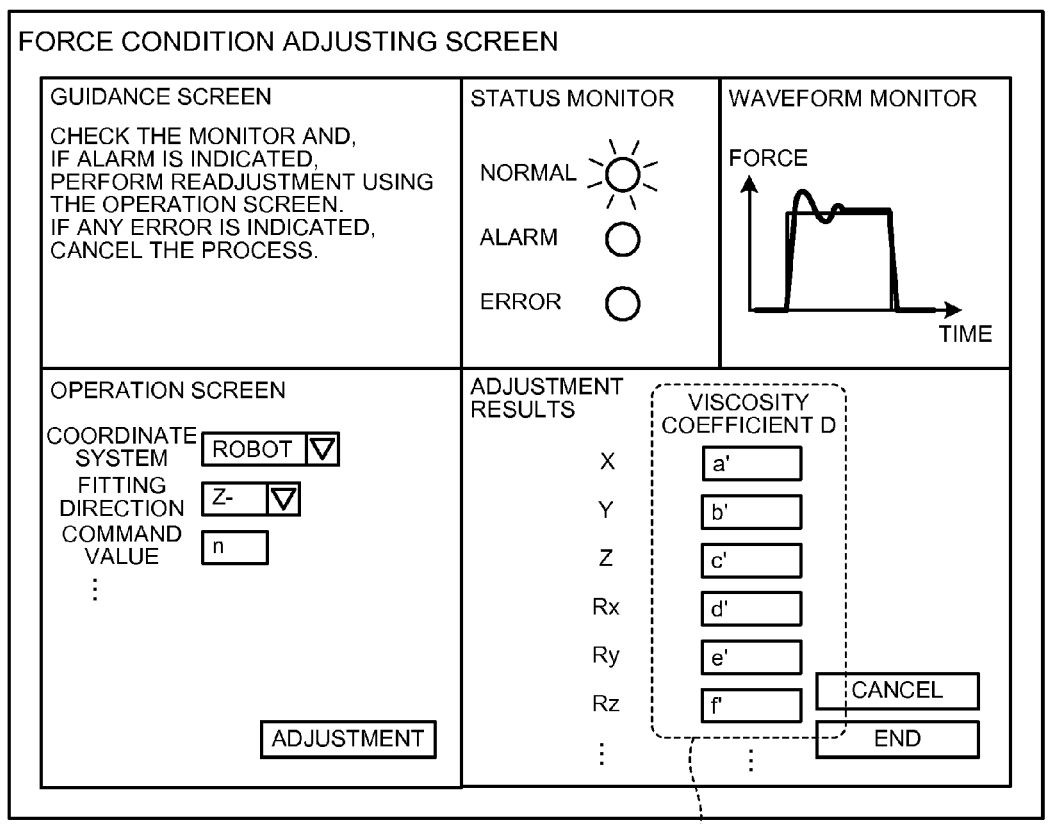

FIG. 5B illustrates a condition in which a force waveform does not disperse after the start with a viscosity initial value, that is, the contact stability is maintained. FIG. 5C illustrates a condition in which the force waveform disperses to develop a contact instability condition.

Specifically, the first adjusting step of the force condition adjusting process finds the viscosity limit value with which the force waveform as illustrated in FIG. 5B is obtained.

Figure 5D:
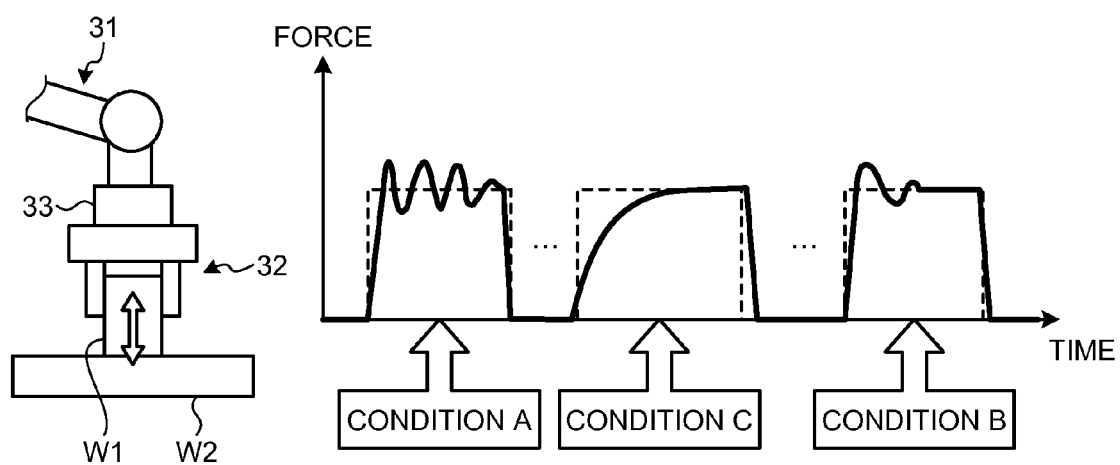

Additionally, as illustrated in FIG. 5D, in the second adjusting step, a force command is given to thereby cause the workpieces W to be in contact with each other repeatedly, thereby finding a viscosity value that yields a good response of the force feedback value $F_{fb}$.

Specifically, the viscosity value is adjusted so that the force response quickly follows the force command (see the rectangular wave in FIG. 5D) as in condition B, without developing hunting as in condition A or without delaying as in condition C.

The force condition adjusting process is achieved by, for example, a force condition adjusting screen illustrated in FIG. 6A accepting the operation of the teacher. All exemplary display screens to be referred to in the following descriptions including FIG. 6A are displayed on the display unit 24 of the PC 20.

All of these exemplary display screens may be collectively referred to as a "teaching operation screen". An input value input by the teacher in the "teaching operation screen" may be collectively referred to as the "specified value".

As illustrated in FIG. 6A, the force condition adjusting screen includes a guidance screen. The guidance screen is a screen area on which teaching support information for the teacher is output. A guidance message appears on the guidance screen, indicating, for example, an operating step of "1. Select a robot." as illustrated in FIG. 6A.

The guidance screen may also display a guide sketch to aid the teacher in understanding as illustrated in FIG. 6A. FIG. 6A illustrates an exemplary display of the name of a robot to be taught and the name of a coordinate system.

This allows support to be provided for the teacher to teach the robot accurately with fewer errors regardless of the degree of skill of the teacher in question.

The teacher performs operations required for the adjustment of the force control parameters according to what is displayed on the guidance screen.

For example, the force condition adjusting screen illustrated in FIG. 6A gives input items displayed in its upper right area. The teacher is to input in the input items such data as the "file number" of the force condition file 12a, the "robot" to be taught, the "coordinate system", the "tool number", and the "fitting direction".

The teacher then touches the "adjustment" button disposed at the lower right corner of the force condition adjusting screen to thereby perform the force condition adjusting process. The force condition adjusting screen displays force control parameters to be adjusted under the heading of "parameter to be adjusted" displayed in its lower right area. This display allows the teacher to be informed of current values of the force control parameters.

Reference is here made to viscosity coefficient D as the "parameter to be adjusted" illustrated in FIG. 6A. Relative to the viscosity coefficient D, "X", "Y", and "Z" represent three translation axes and "Rx", "Ry", and "Rz" represent three rotating axes. Parameters of these axes are assumed to be "a", "b", "c", "d", "e", and "f", respectively, before the adjustment.

FIG. 6B illustrates an exemplary force condition adjusting screen after the "adjustment" button illustrated in FIG. 6A has been touched and the force condition adjusting process has been performed once. As illustrated in FIG. 6B, the force condition adjusting screen after the adjustment also displays a guidance screen to aid the teacher in taking the next step.

For example, FIG. 6B illustrates an exemplary guidance display stating that "Check the monitor and, if alarm is indicated, perform readjustment using the operation screen. If any error is indicated, cancel the process."

As illustrated in the exemplary guidance display, the force condition adjusting screen after the adjustment may indicate, for example, a status monitor including "normal", "alarm", and "error". The exemplary status monitor is a lamp-like status monitor that can be turned ON or OFF, which is not the only possible arrangement. The teacher can select the next step to perform in accordance with the guidance screen and the contents of the status monitor.

In addition, the force condition adjusting screen after the adjustment may display, for example, a force waveform based on a measured value of the force sensor 33 as a waveform monitor as illustrated in FIG. 6B. Giving the monitor display, such as the status monitor and the waveform monitor, can aid the teacher in teaching the robot accurately with fewer errors regardless of the degree of skill of the teacher in question.

For example, the force condition adjusting screen after the performance of the process further displays an operation screen to be used when readjustment is necessary in its lower left area. To follow the instructions on the guidance screen illustrated in FIG. 6B and given the "alarm" status monitor, the teacher uses the operation screen to re-input such data as the "coordinate system", the "fitting direction", and the "command value" and then touches the "adjustment" button to direct readjustment.

For example, the force condition adjusting screen after the performance of the process also displays adjustment results in its lower right area. FIG. 6B illustrates exemplary adjustment results that are "a'", "b'", "c'", "d'", "e'", and "f'" in that order from the top of the viscosity coefficient D (see a closed curve 601 in FIG. 6B). The teacher can check values after the adjustment with these adjustment results.

If the "normal" status monitor is illuminated as illustrated in FIG. 6B, the teacher checks the adjustment results and then touches the "end" button to terminate the force condition adjusting process. If the status monitor indicates "error", the teacher touches the "cancel" button to thereby cancel the force condition adjusting process.

Figure 7A:
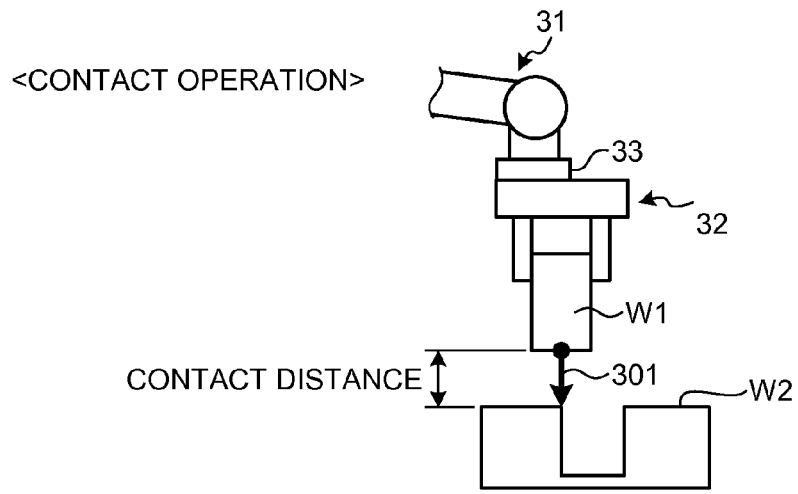
FIGS. 7A to 7C are diagrams (part 1) to (part 3) illustrating an operating condition adjusting process.
Figure 7B:
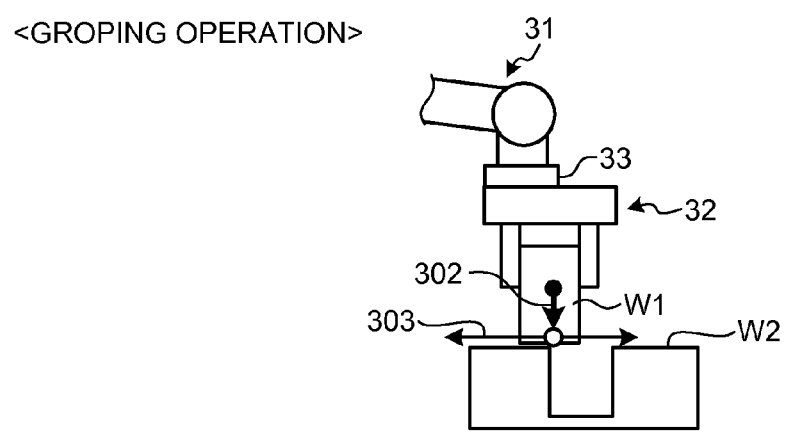
Figure 7C:
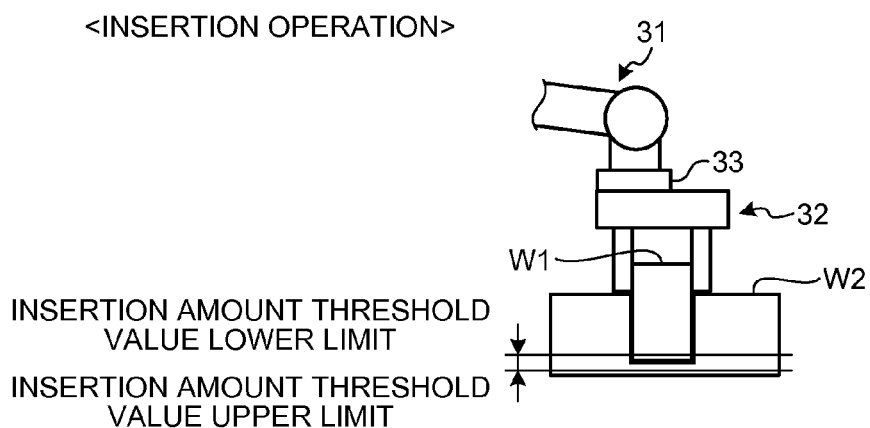

The following describes the operating condition adjusting process in detail. FIGS. 7A to 7C are diagrams (part 1) to (part 3) illustrating the operating condition adjusting process.

The operating condition adjusting process according to the first embodiment adjusts the operating condition parameters 12b that define operating conditions in each of the "contact operation", the "groping operation", and the "insertion operation" in the fitting work based on the force control parameters adjusted in the force condition adjusting process and the operation of the teacher.

Exemplary operating condition parameters 12b that are adjusted are as follows. In the contact operation, the "contact distance" between the workpiece W1 and the workpiece W2, for example, is adjusted as illustrated in FIG. 7A. In the groping operation, for example, the "groping cycle" (groping amount) is adjusted as illustrated in FIG. 7B. In the insertion operation, for example, an "insertion amount threshold value lower limit" and an "insertion amount threshold value upper limit" are adjusted as illustrated in FIG. 7C.

The "contact distance", the "groping cycle", the "insertion amount threshold value lower limit", the "insertion amount threshold value upper limit", and the like need to be adjusted to setting values suitable for shapes of the workpieces W. In the operating condition adjusting process, therefore, the robot 30 is operated based on the operation of the teacher performed so as to follow the guidance, the shapes of the workpieces W are measured using, for example, the force feedback values and the position feedback values from the robot 30 (each servomotor), and thereby the operating condition parameters 12b are adjusted.

Figure 8A:
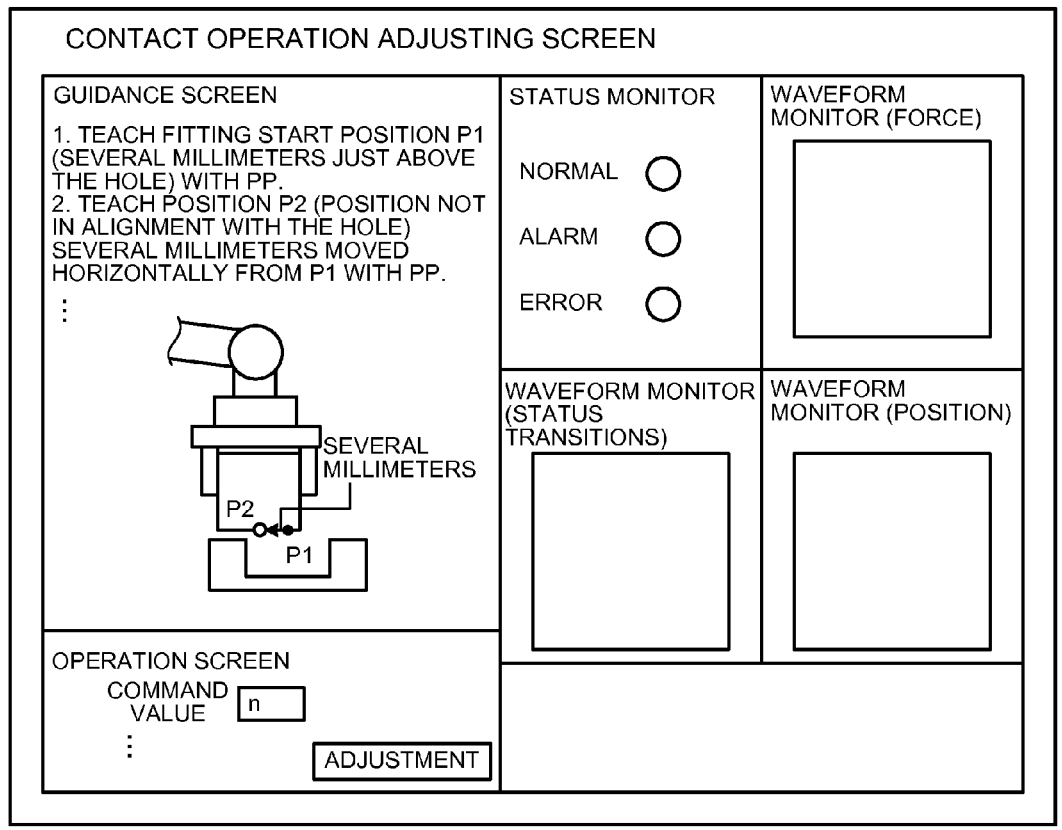
FIGS. 8A and 8B are schematic diagrams (part 1) and (part 2) illustrating exemplary operating steps of a contact operation adjusting process.

The following describes specific exemplary operating steps of the operating condition adjusting process with reference to FIGS. 8A to 10B. FIGS. 8A and 8B are schematic diagrams (part 1) and (part 2) illustrating exemplary operating steps of a contact operation adjusting process.

Figure 9A:
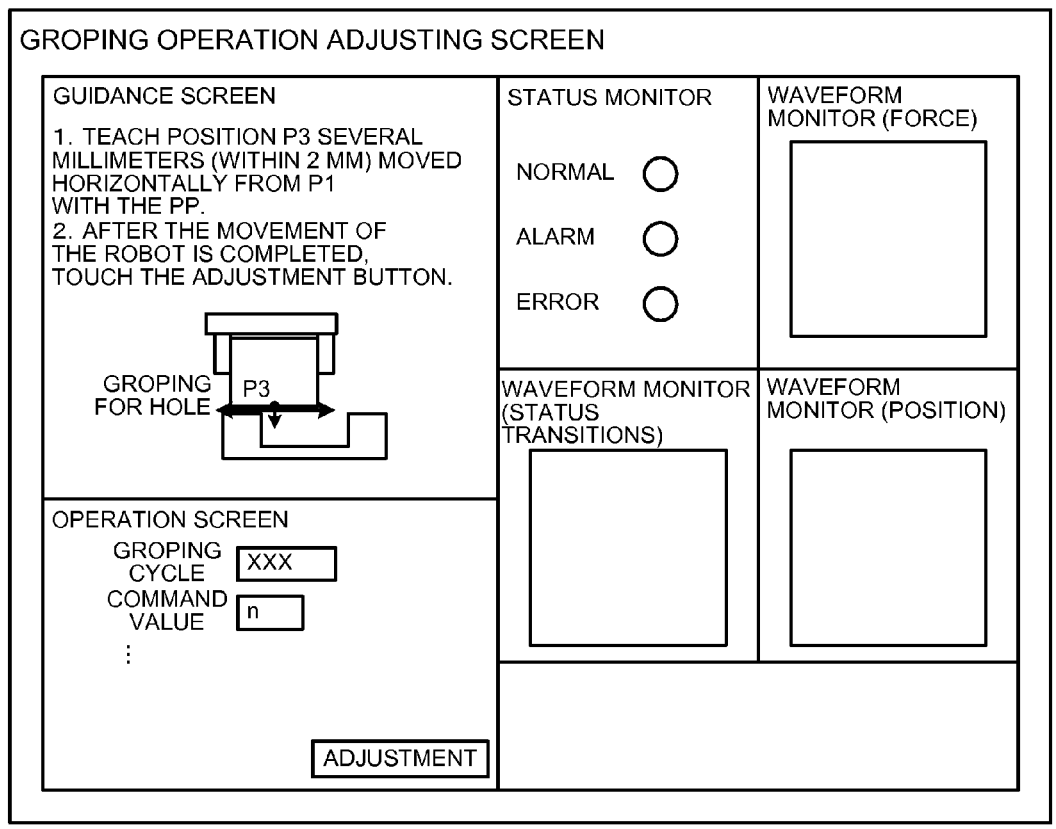
FIGS. 9A and 9B are schematic diagrams (part 1) and (part 2) illustrating exemplary operating steps of a groping operation adjusting process.
Figure 9B:
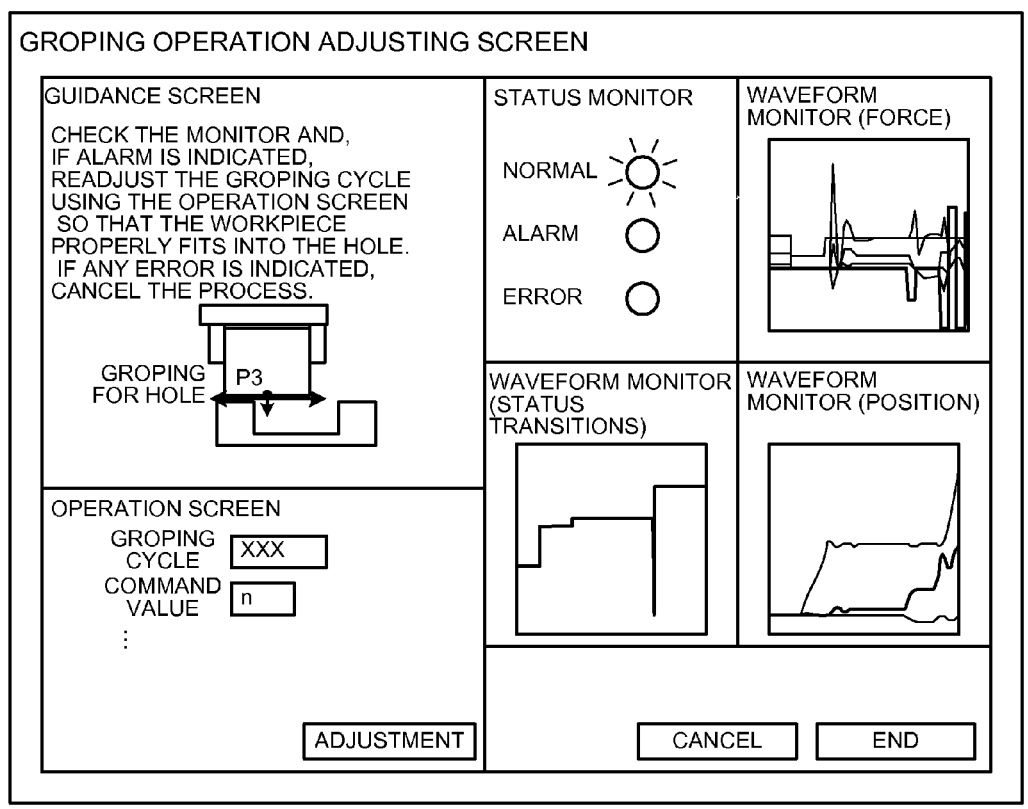
Figure 10A:
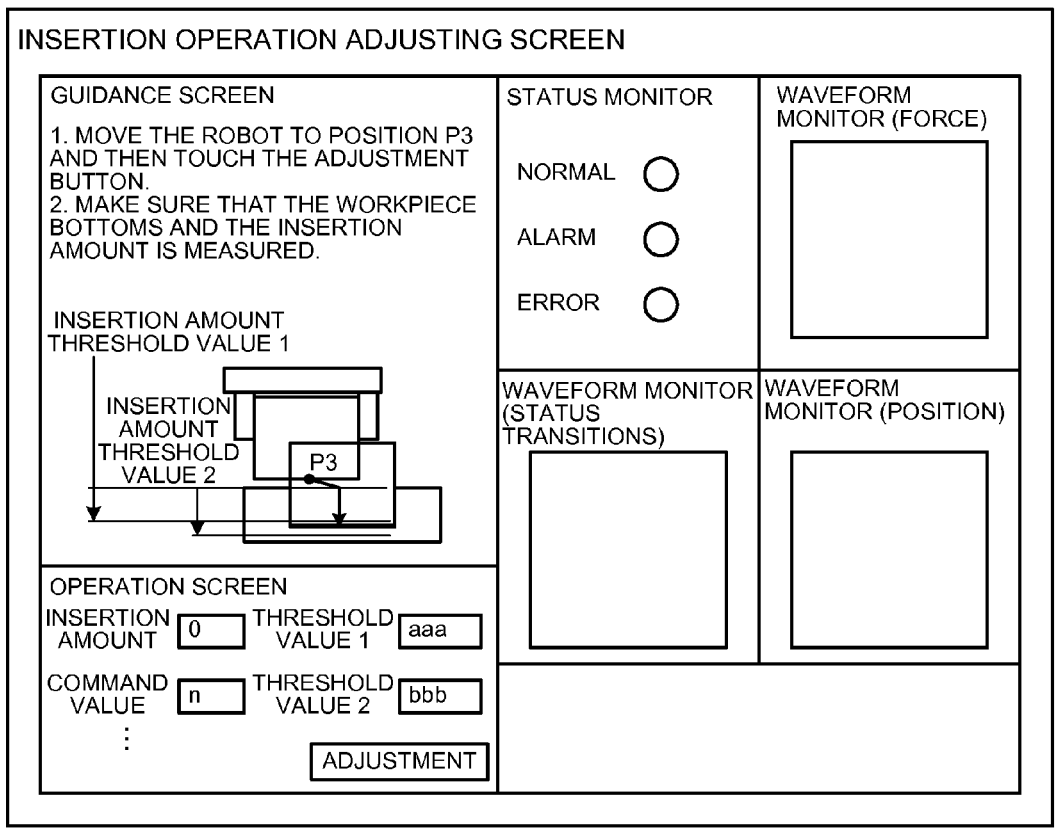
FIGS. 10A and 10B are schematic diagrams (part 1) and (part 2) illustrating exemplary operating steps of an insertion operation adjusting process.
Figure 10B:
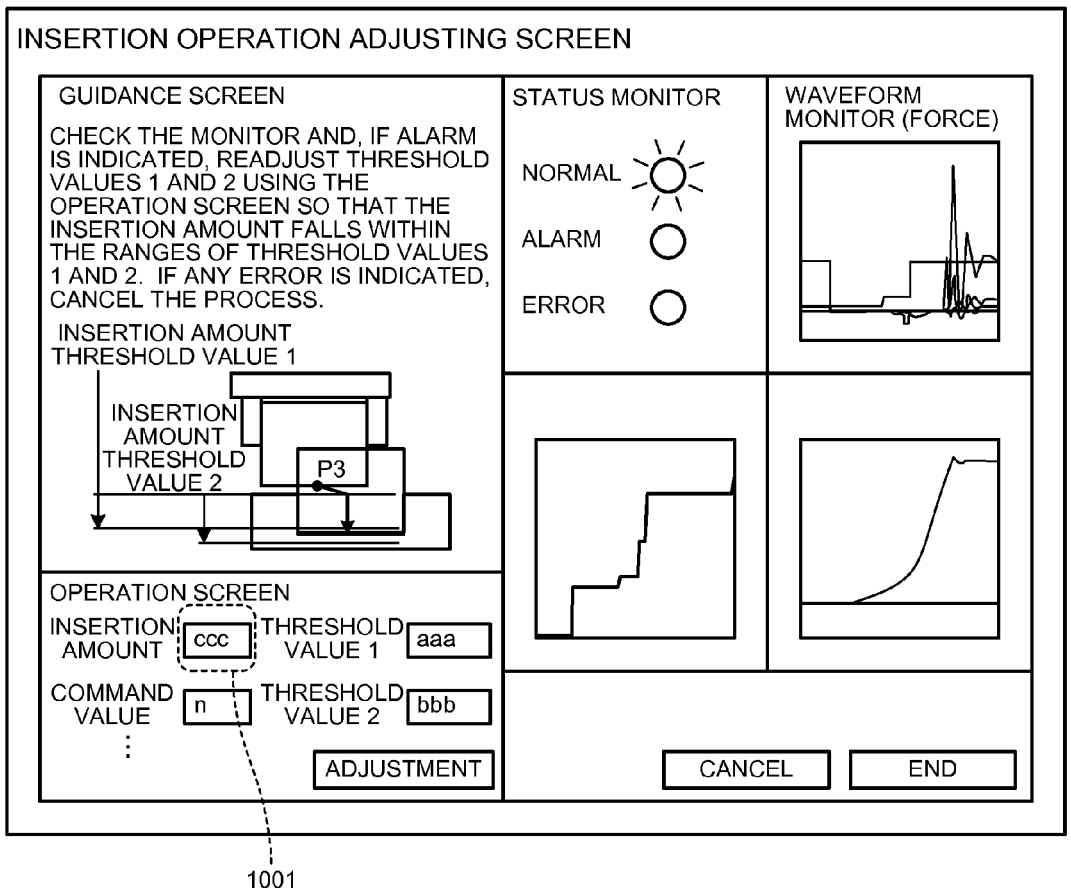

FIGS. 9A and 9B are schematic diagrams (part 1) and (part 2) illustrating exemplary operating steps of a groping operation adjusting process. FIGS. 10A and 10B are schematic diagrams (part 1) and (part 2) illustrating exemplary operating steps of an insertion operation adjusting process.

The contact operation will first be described. As illustrated in FIG. 8A, a contact operation adjusting screen includes a guidance screen as in the force condition adjusting screen (FIGS. 6A and 6B).

As illustrated in FIG. 8A, the guidance screen displays guidance messages indicating operating steps, such as "1. Teach fitting start position P1 (several millimeters just above the hole) with the PP." and "2. Teach position P2 (position not in alignment with the hole) several millimeters moved horizontally from P1 with the PP."

The guidance screen may also display a guide sketch associated with the guidance messages as illustrated in FIG. 8A.

This allows support to be provided for the teacher to teach the robot accurately with fewer errors regardless of the degree of skill of the teacher in question. The teacher performs operations required for the adjustment of the operating condition parameters 12b relating to the contact operation according to what is displayed on the guidance screen.

For example, the contact operation adjusting screen illustrated in FIG. 8A includes an operation screen in its lower left area. The teacher is to input data in the input items in the operation screen, e.g., the "command value". Before the teacher performs the input operation, default values included in the operating condition parameters 12b are displayed in the input items of the operation screen.

The contact operation adjusting screen further includes a monitor display area including a status monitor and a waveform monitor placed in its right-hand side, as in the force condition adjusting screen (see FIG. 6B).

The monitor display area displays a force waveform (see the waveform monitor (force) in FIG. 8A), a status transition waveform (see the waveform monitor (status transitions) in FIG. 8A), and a position waveform (see the waveform monitor (position) in FIG. 8A) obtained by causing the robot 30 to perform the contact operation in the contact operation adjusting process.

When the teacher performs teaching using the PC 20 according as instructed by the guidance message, inputs the command value and the like, and then touches the "adjustment" button, a "start" button is then enabled on the programming pendant 40. The teacher touches the "start" button to perform the contact operation adjusting process. Starting the robot 30 with the programming pendant 40 after the settings made on the PC 20 prevents the robot 30 from being operated with the PC 20 by a second operator while a first operator performs teaching using the programming pendant 40 near the robot. In the fitting function, the operation of the robot 30 can be started only from the programming pendant 40. The same holds for the groping operation and the insertion operation.

Figure 8B:
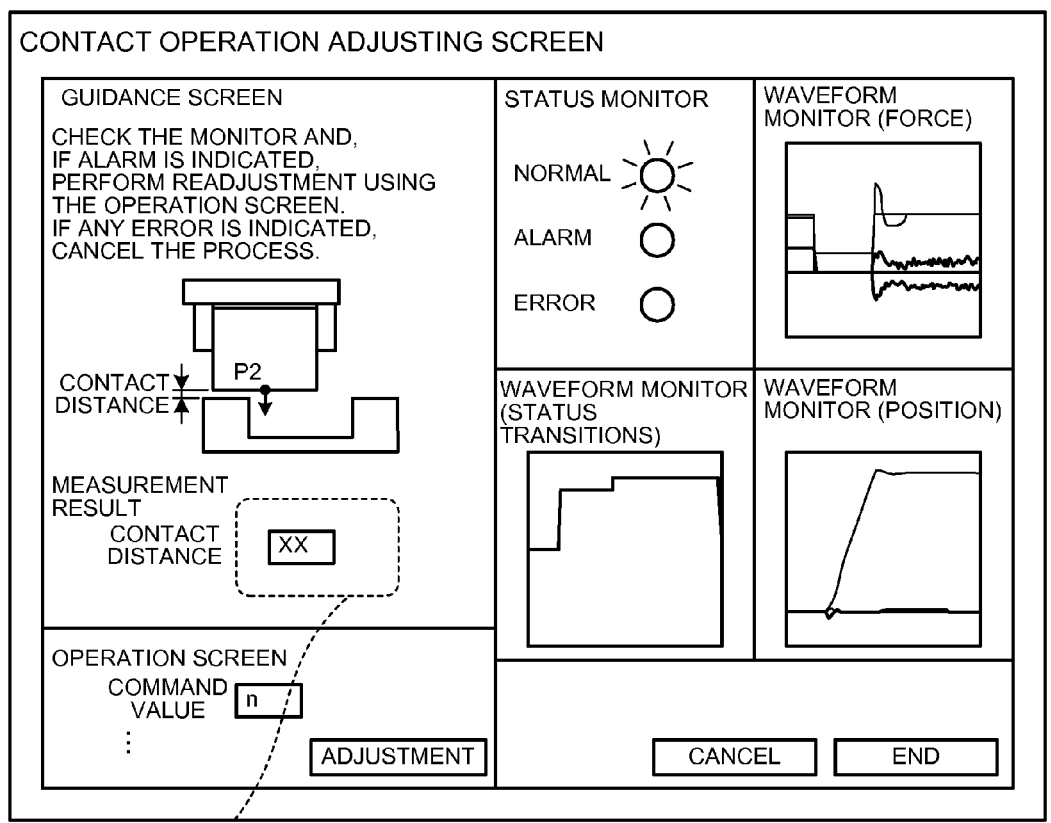

FIG. 8B illustrates an exemplary contact operation adjusting screen after the "adjustment" button illustrated in FIG. 8A has been touched and the contact operation adjusting process has been performed once. As illustrated in FIG. 8B, the contact operation adjusting screen after the performance of the process also displays a guidance screen to aid the teacher in taking the next step.

For example, FIG. 8B illustrates an exemplary guidance display stating that "Check the monitor and, if alarm is indicated, perform readjustment using the operation screen. If any error is indicated, cancel the process."

Additionally, for example, the guidance screen also displays the contact distance as a measurement result in its lower area (see a closed curve 801 in FIG. 8B). The teacher can check the measured value with this measurement result.

For example, the contact operation adjusting screen after the performance of the process further displays an operation screen to be used when readjustment is necessary in its lower left area. To follow the instructions on the guidance screen illustrated in FIG. 8B and given the "alarm" status monitor, the teacher uses the operation screen to re-input such data as the "command value" and then touches the "adjustment" button to direct readjustment.

If the "normal" status monitor is illuminated as illustrated in FIG. 8B, the teacher checks each waveform monitor and the measurement result and then touches the "end" button to terminate the contact operation adjusting process. If the status monitor indicates "error", the teacher touches the "cancel" button to thereby cancel the contact operation adjusting process.

The following describes the groping operation. As illustrated in FIG. 9A, a groping operation adjusting screen is configured to basically include a screen layout identical to that of the contact operation adjusting screen (FIGS. 8A and 8B).

Specifically, as illustrated in FIG. 9A, the guidance screen displays guidance messages indicating operating steps, such as "1. Teach position P3 several millimeters (within 2 mm) moved horizontally from P1 with the PP." and "2. After the movement of the robot is completed, touch the adjustment button."

The guidance screen also displays a guide sketch associated with the guidance messages.

This allows support to be provided for the teacher to teach the robot accurately with fewer errors regardless of the degree of skill of the teacher in question. The teacher performs operations required for the adjustment of the operating condition parameters 12b relating to the groping operation according to what is displayed on the guidance screen.

For example, the teacher is to input data in the input items in the operation screen in the lower left area, e.g., the "groping cycle" and the "command value". Before the teacher performs the input operation, default values included in the operating condition parameters 12b or the current values carried over from the preceding process are displayed in the input items of the operation screen.

The teacher performs teaching using the programming pendant 40 (PP) according as instructed by the guidance message and inputs the groping cycle, the command value, and the like. The teacher then touches the "adjustment" button to perform the groping operation adjusting process.

FIG. 9B illustrates an exemplary groping operation adjusting screen after the "adjustment" button illustrated in FIG. 9A is touched and the groping operation adjusting process is performed once. As illustrated in FIG. 9B, the groping operation adjusting screen after the performance of the process also displays a guidance screen to aid the teacher in taking the next step.

For example, FIG. 9B illustrates an exemplary guidance display stating that "Check the monitor and, if alarm is indicated, readjust the groping cycle using the operation screen so that the workpiece properly fits into the hole. If any error is indicated, cancel the process."

To follow the instructions on the guidance screen illustrated in FIG. 9B and if the status monitor displays "alarm", the teacher re-inputs the "groping cycle" from the operation screen in the lower left area and touches the "adjustment" button to direct readjustment.

If the "normal" status monitor is illuminated as illustrated in FIG. 9B, the teacher checks each waveform monitor and then touches the "end" button to terminate the groping operation adjusting process. If the status monitor indicates "error", the teacher touches the "cancel" button to thereby cancel the groping operation adjusting process.

The following describes the insertion operation. As illustrated in FIG. 10A, an insertion operation adjusting screen is configured to basically include a screen layout identical to that of the contact operation adjusting screen (FIGS. 8A and 8B).

Specifically, as illustrated in FIG. 10A, the guidance screen displays guidance messages indicating operating steps, such as "1. Move the robot to position P3 and then touch the adjustment button." and "2. Make sure that the workpiece bottoms and the insertion amount is measured."

The guidance screen also displays a guide sketch associated with the guidance messages.

This allows support to be provided for the teacher to teach the robot accurately with fewer errors regardless of the degree of skill of the teacher in question. The teacher performs operations required for the adjustment of the operating condition parameters 12b relating to the insertion operation according to what is displayed on the guidance screen.

For example, the teacher is to input data in the input items in the operation screen in the lower left area, e.g., "threshold value 1", "threshold value 2", and the "command value". Before the teacher performs the input operation, default values included in the operating condition parameters 12b or the current values carried over from the preceding process are displayed in the input items of the operation screen.

The teacher performs teaching using the programming pendant 40 (PP) according as instructed by the guidance message and inputs threshold value 1, threshold value 2, the command value, and the like. The teacher then touches the "adjustment" button to perform the insertion operation adjusting process.

FIG. 10B illustrates an exemplary insertion operation adjusting screen after the "adjustment" button illustrated in FIG. 10A has been touched and the insertion operation adjusting process has been performed once. As illustrated in FIG. 10B, the insertion operation adjusting screen after the performance of the process also displays a guidance screen to aid the teacher in taking the next step.

For example, FIG. 10B illustrates an exemplary guidance display stating that "Check the monitor and, if alarm is indicated, readjust threshold values 1 and 2 using the operation screen so that the insertion amount falls within the ranges of threshold values 1 and 2. If any error is indicated, cancel the process."

The operation screen displays, for example, a measured value of the insertion amount (see the closed curve 1001 in FIG. 10B).

To follow the instructions on the guidance screen illustrated in FIG. 10B, if the status monitor indicates "alarm", the teacher re-inputs "threshold value 1" and "threshold value 2" from the operation screen in the lower left area and touches the "adjustment" button to direct readjustment.

If the "normal" status monitor is illuminated as illustrated in FIG. 10B, the teacher checks each waveform monitor and then touches the "end" button to terminate the insertion operation adjusting process. If the status monitor indicates "error", the teacher touches the "cancel" button to thereby cancel the insertion operation adjusting process.

Figure 11:
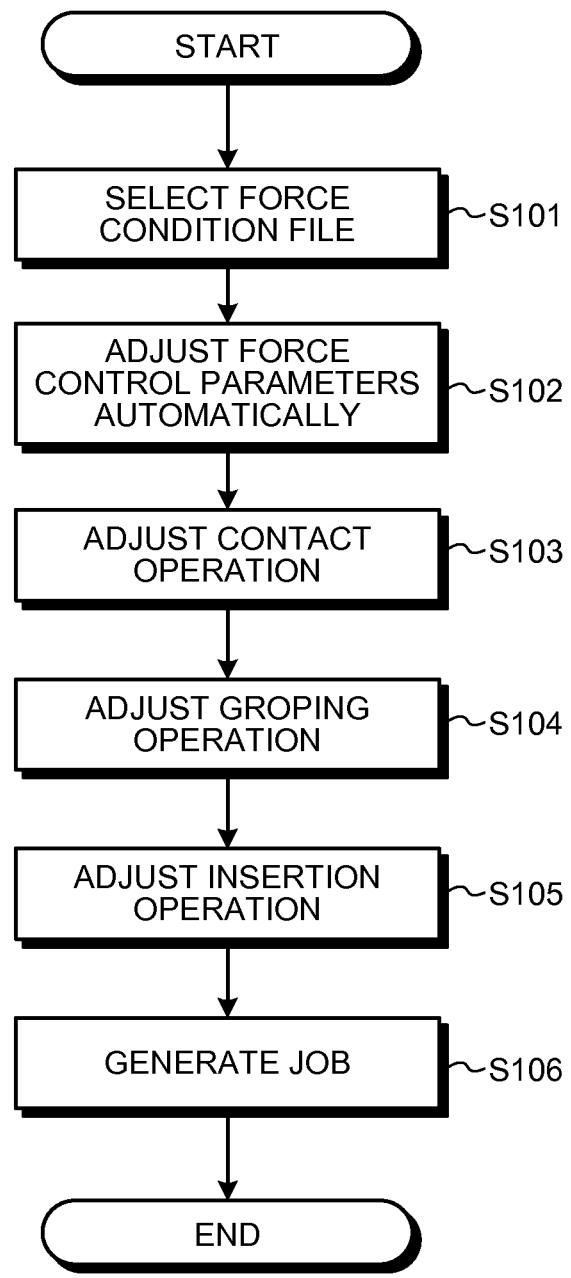
FIG. 11 is a flowchart illustrating processing steps performed by the robot teaching system according to the first embodiment.

The following describes processing steps performed by the robot teaching system 1 according to the first embodiment with reference to FIG. 11. FIG. 11 is a flowchart illustrating the processing steps performed by the robot teaching system 1 according to the first embodiment.

As illustrated in FIG. 11, when the teacher selects the default force condition file 12a (Step S101), the force condition adjuster 11a automatically adjusts the force control parameters (Step S102).

The contact operation adjuster 11ca of the operating condition adjuster 11c adjusts the contact operation (Step S103). Specifically, the contact operation adjuster 11ca adjusts the operating condition parameters 12b relating to the contact operation.

The groping operation adjuster 11cb of the operating condition adjuster 11c adjusts the groping operation (Step S104). Specifically, the groping operation adjuster 11cb adjusts the operating condition parameters 12b relating to the groping operation.

The insertion operation adjuster 11cc of the operating condition adjuster 11c adjusts the insertion operation (Step S105). Specifically, the insertion operation adjuster 11cc adjusts the operating condition parameters 12b relating to the insertion operation.

Then, the job generator 11d generates a job in which the adjusted operating condition parameters 12b are incorporated (Step S106) and the process is terminated.

As described heretofore, the robot teaching system according to the first embodiment includes a robot, a sensor, a screen generator, adjusters (a force condition adjuster, an operating condition adjuster), and a job generator.

The sensor measures measured values relating to the operations of the robot. The screen generator generates a teaching operation screen that includes guidance information intended for the teacher.

The adjusters adjust parameters for generating a job based on specified values relating to operations of the robot and input in the teaching operation screen, and the measured values of the sensor associated with the specified values, the parameters defining an operation command including corrections of the operations of the robot. The job generator generates the job in which the parameters adjusted by the adjusters are incorporated.

Thus, the robot teaching system according to the first embodiment enables efficient and accurate teaching to be performed through simple operations regardless of the degree of skill of the teacher in question.

The first embodiment has been described for an exemplary case in which the teacher is required to input data for each of the force condition adjuster, the contact operation adjuster, the groping operation adjuster, and the insertion operation adjuster, so that the force control parameters or the operating condition parameters are individually adjusted.

This is, however, not the only possible arrangement. Alternatively, for example, a series of adjustments may be continuously automated. Specifically, when an input of information required for the adjustment of the force control parameters is received from the teacher, the subsequent steps are simply to carry over the adjustment result of a preceding process to a subsequent process in sequence, specifically, from the force condition adjuster to the contact operation adjuster, from the contact operation adjuster to the groping operation adjuster, and from the groping operation adjuster to the insertion operation adjuster.

During these processes, for any parameter that requires an input based on a geometric shape of the workpiece, the shape of the workpiece is roughly estimated using, for example, a position feedback value and an adjustment value corresponding to the estimated shape may be calculated and passed onto each adjuster.

The first embodiment has been described for a case in which the adjusters (the force condition adjuster, the operating condition adjuster) are included in the controller. These adjusters may be disposed in the PC. An arrangement in which such adjusters are disposed in the PC will be described below as a second embodiment.

Second Embodiment

Figure 12:
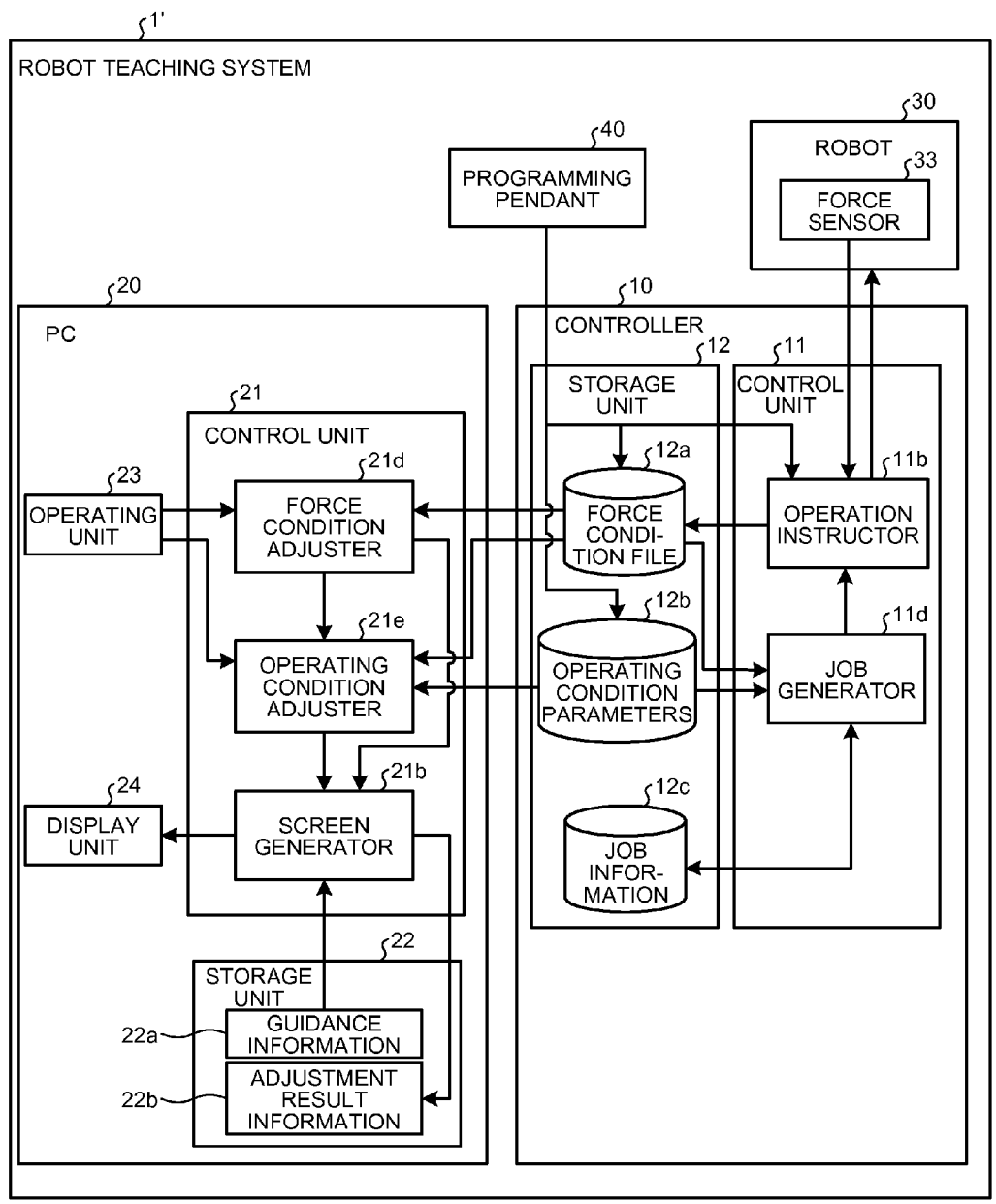
FIG. 12 is a block diagram illustrating a robot teaching system according to a second embodiment.

FIG. 12 is a block diagram illustrating a robot teaching system 1' according to the second embodiment. FIG. 12 illustrates only those elements that are required for describing the robot teaching system 1' and omits general elements included therein. In addition, FIG. 12 corresponds to FIG. 2 that illustrates the block diagram of the first embodiment. Thus, corresponding elements included in both the first and second embodiments are identified by the same reference numerals and descriptions for those elements may be simplified or omitted.

In the second embodiment, the measured value of a force sensor 33 is sent to a controller 10 and stored in a force condition file 12a. The measured value of the force sensor 33 is then read by a PC 20 for use in the force condition adjusting process and the operating condition adjusting process.

A programming pendant 40 functions as a teaching device that outputs various types of parameters input by the teacher to the controller 10 to thereby teach a robot 30 various operating modes. The controller 10 generates a job based on, for example, the various types of parameters input from the programming pendant 40 and outputs to the robot 30 an operation command that causes the robot 30 to perform the generated job, thus controlling operations of the robot 30.

The PC 20 functions as a robot teaching assistant device that assists the teacher in teaching the robot 30 the operating modes by providing the teacher with guidance information on the input of various types of parameters to the programming pendant 40.

The PC 20 accepts an input operation of the specified value for defining the job (operation command) including corrections to be made of the operating mode of the robot 30 based on the measured value of the force sensor 33. Then, the PC 20 adjusts parameters that correct the operating mode of the robot 30 based on the specified value input thereto and the measured value of the force sensor 33.

Furthermore, the PC 20 generates and displays the teaching operation screen that includes the guidance information on the input of the adjusted parameters to the programming pendant 40, thereby guiding the teacher in, for example, an operating procedure of the programming pendant 40.

This allows the teacher to input the various types of parameters to the programming pendant 40 according to the guidance information provided by the PC 20, thereby enabling the teacher to teach the robot 30 accurately with fewer errors regardless of the degree of skill the teacher has.

The following describes the second embodiment in greater detail. As illustrated in FIG. 12, the controller 10 includes a control unit 11 and a storage unit 12. The control unit 11 includes an operation instructor 11b and a job generator 11d. The storage unit 12 stores therein the force condition file 12a, an operating condition parameters 12b, and job information 12c.

The force condition file 12a includes various types of parameters required for causing the robot 30 to perform operations for the force condition adjusting process. Default values are written in the force condition file 12a in the initial condition.

Additionally, the teacher can correct the operating modes for the force condition adjusting process performed by the robot 30 by operating the programming pendant 40 to thereby input desired parameters and accordingly overwrite the force condition file 12a.

Data written in the force condition file 12a include the measured values taken by the force sensor 33 during operation of the robot 30 and feedback values of measured values taken by other sensors (not illustrated) disposed in the robot 30. Examples of the other sensors include position sensors that detect angular positions of servomotors that drive an arm 31 and a hand 32.

The operating condition parameters 12b include, for example, various types of parameters required for causing the robot 30 to perform the operations of the operating condition adjusting process, such as a "contact operation", a "groping operation", and an "insertion operation". The teacher can correct the operating modes for the operating condition adjusting process performed by the robot 30 by operating the programming pendant 40 to thereby input desired parameters and accordingly overwrite the operating condition parameters 12b.

The job generator 11d generates, based on the various types of parameters included in the force condition file 12a, the job information 12c that defines a job for causing the robot 30 to perform the operations for the force condition adjusting process and stores the job information 12c in the storage unit 12.

The job generator 11d generates, based on the various types of parameters included in the force condition file 12a, and the operating condition parameters 12b, the job information 12c that defines a job for causing the robot 30 to perform the operations for the operating condition adjusting process and stores the job information 12c in the storage unit 12.

The operation instructor 11b, upon receipt of an input of a control signal that starts a predetermined operation according to an operation performed by the teacher from the programming pendant 40, reads the job information 12c from the storage unit 12 via the job generator 11d.

The operation instructor 11b interprets the read job information 12c, generates an operation command for each joint (servomotor) of the robot 30, and outputs the operation command to the robot 30, thereby causing the robot 30 to perform the operations of the force condition adjusting process or the operations of the operating condition adjusting process.

The programming pendant 40 is a terminal device operated by the teacher to teach or correct operating modes and start an operation relative to the robot 30. The teacher can, for example, teach or correct the operating modes to the robot 30 by operating the programming pendant 40 to thereby input the above-described various types of parameters and the like.

The teacher who operates the programming pendant 40 is required to have a predetermined degree of skill. That is, not everyone can easily operate the programming pendant 40 to teach or correct the operating modes of the robot 30.

The robot teaching system 1' therefore uses the PC 20 to provide guidance on the operating method of the programming pendant 40 and suggest appropriate parameters to be input to the programming pendant 40, thereby assisting the teacher in operating the programming pendant 40.

The PC 20 suggests to the teacher, for example, items and specified values to be input to the programming pendant 40 to thereby prompt the teacher to input, for example, default values of parameters to the PC 20 and the programming pendant 40. The PC 20 then prompts the teacher to start operating the robot 30 by operating the programming pendant 40.

Thereafter, the PC 20 adjusts the various types of parameters based on the feedback values of the measured values of the force sensor 33 and of the other sensors (not illustrated) disposed in the robot 30 as obtained through the operation of the robot 30.

The PC 20 causes the teacher to input the adjusted parameters to the PC 20 and the programming pendant 40. The PC 20 then operates the programming pendant 40 again to operate the robot 30 and adjusts the parameters based on the operation results. These operations are repeatedly performed.

As illustrated in FIG. 12, the PC 20 includes a control unit 21, a storage unit 22, an operating unit 23, and a display unit 24. The storage unit 22 stores therein guidance information 22a and adjustment result information 22b.

The operating unit 23 receives an operation of the teacher and outputs specific contents of the operation to the control unit 21. For example, the operating unit 23 receives an input operation of a specified value or the like for defining an operation command that includes a correction of an operating mode of the robot 30 based on a measured value of the force sensor 33 and outputs the specific contents of the input operation to the control unit 21.

The control unit 21 is a processor that performs general control of the PC 20. The control unit 21 includes a force condition adjuster 21d, an operating condition adjuster 21e, and a screen generator 21b.

The force condition adjuster 21d is an exemplary first adjuster in the second embodiment and the operating condition adjuster 21e is an exemplary second adjuster in the second embodiment.

The force condition adjuster 21d performs the force condition adjusting process that adjusts the force control parameters based on the specific contents of the operation input from the operating unit 23, the force control parameters in the force condition file 12a read from the storage unit 12 of the controller 10, and the above-described feedback values. Contents of the force condition adjusting process have been described with reference to FIGS. 5A to 5D and will not here be reiterated.

The force condition adjuster 21d outputs the adjusted force control parameters to the operating condition adjuster 21e and the screen generator 21b.

The operating condition adjuster 21e performs the operating condition adjusting process that adjusts the operating condition parameters 12b based on the specific contents of the operation input from the operating unit 23, the adjusted force control parameters, the operating condition parameters 12b read from the storage unit 12 of the controller 10, and the above-described feedback values. The operating condition parameters 12b to be adjusted in this process are those that specify operating conditions of the "contact operation", the "groping operation", and the "insertion operation" in the fitting work.

Details of the "contact operation", the "groping operation", and the "insertion operation" have been described with reference to FIGS. 3A to 3C and will not here be reiterated. Contents of the operating condition adjusting process have been described with reference to FIGS. 7A to 7C and will not here be reiterated.

The force condition adjuster 21d outputs the adjusted operating condition parameters 12b to the screen generator 21b.

The screen generator 21b generates a display screen that assists in operations of the programming pendant 40 based on the various types of parameters input from the force condition adjuster 21d and the operating condition adjuster 21e and the guidance information 22a read from the storage unit 22 and outputs the generated display screen to the display unit 24.

In this process, the screen generator 21b generates a display screen in which the latest conditions of the force condition file 12a and the operating condition parameters 12b, a guidance message for the teacher included in the guidance information 22a, and the like are incorporated as appropriate and outputs the generated display screen to the display unit 24. The display unit 24 is a display device, such as a display, that displays a display screen input from the screen generator 21b.

The screen generator 21b stores as the adjustment result information 22b the display screen as a result of the force condition adjusting process being completed by the force condition adjuster 21d and the display screen as a result of the operating condition adjusting process being completed by the operating condition adjuster 21e in the storage unit 22.

This allows the PC 20 to suggest appropriate parameters that have already been adjusted to, for example, a different teacher who attempts to use the robot teaching system 1' next time by displaying the adjustment result information 22b on the display unit 24.

In the robot teaching system 1', the teacher operates the programming pendant 40 to thereby cause the robot 30 to perform the "contact operation", the "groping operation", and the "insertion operation" and the force feedback values obtained thereby are then acquired from the force sensor 33.

The operating condition parameters 12b include a default operating condition of each of the "contact operation", the "groping operation", and the "insertion operation" as a default parameter. The PC 20, in the beginning, prompts the teacher to input such a default parameter from the programming pendant 40 and causes the operation instructor 11b to operate the robot 30.

Next, the PC 20 adjusts the operating condition parameters 12b based on the acquired force feedback values. In this process, the acquired force feedback values and status transitions are displayed in sequence on the display unit 24 of PC 20.

The teacher is allowed to input readjusted values according to what are displayed on the PC 20 as described above. If any readjusted value is input by the teacher, the PC 20 prompts the teacher to input the readjusted value to the programming pendant 40 and operates the robot 30 accordingly.

The PC 20 then readjusts the operating condition parameters 12b based on resultantly acquired feedback values. The operating condition parameters 12b are optimized through the foregoing steps repeatedly performed.

Specific exemplary operating steps of the force condition adjusting process according to the second embodiment will be described below. Referring to FIGS. 6A and 6B mentioned earlier, the following describes the second embodiment.

The force condition adjusting process according to the second embodiment is achieved by, for example, the teacher operating the PC 20 and the programming pendant 40 according to the force condition adjusting screen displayed on the display unit 24 of the PC 20.

As noted earlier, all of the exemplary display screens to be referred to in the following description may be collectively referred to as the "teaching operation screen". Similarly, as noted earlier, an input value input by the teacher to the PC 20 and the programming pendant 40 according as instructed by the "teaching operation screen" may be collectively referred to as the "specified value".

As illustrated in FIG. 6A, the force condition adjusting screen includes a guidance screen. The guidance screen is a screen area on which teaching support information for the teacher is output. A guidance message appears on the guidance screen, indicating, for example, an operating step of "1. Select the robot." as illustrated in FIG. 6A.

The guidance screen may also display a guide sketch to aid the teacher in understanding as illustrated in FIG. 6A. FIG. 6A illustrates an exemplary display of the name of a robot to be taught and the name of a coordinate system.

While referring to the guidance screen and the guide sketch, the teacher performs operations required for adjusting the force control parameters on the PC 20 and the programming pendant 40. The teacher can thereby perform accurate teaching with fewer errors regardless of the degree of skill the teacher has.

For example, the force condition adjusting screen illustrated in FIG. 6A gives input items displayed in its upper right area. The teacher may operate the PC 20, while referring to the guidance screen, to input such specified items as the "file number" of the force condition file 12a, the "robot" to be taught, the "coordinate system", the "tool number", and the "fitting direction". This causes the input items to display input results.

Reference is here made to viscosity coefficient D as the "parameter to be adjusted" illustrated in FIG. 6A. Relative to the viscosity coefficient D, "X", "Y", and "Z" represent three translation axes and "Rx", "Ry", and "Rz" represent three rotating axes. Parameters of these axes are assumed to be "a", "b", "c", "d", "e", and "f", respectively, before the adjustment.

Additionally, the force condition adjusting screen displays the force control parameters to be adjusted under the heading of "parameter to be adjusted" displayed in its lower right area. This display allows the teacher to be informed of the current values of the force control parameters.

While referring to the force condition adjusting screen displayed on the display unit 24 of the PC 20, the teacher operates the programming pendant 40 to input the viscosity coefficient D before the adjustment and operates the "start" button of the programming pendant 40 to thereby cause the robot 30 to perform the operations for the force condition adjusting process.

The measured values taken by the force sensor 33 during the operation for the force condition adjusting process performed by the robot 30 are sent to the controller 10 and recorded in the force condition file 12a. These measured values are used for the force condition adjusting process by the force condition adjuster 21d of the PC 20.

Thereafter, the teacher touches the "adjustment" button disposed at the lower right corner of the force condition adjusting screen to thereby perform the force condition adjusting process. FIG. 6B illustrates an exemplary force condition adjusting screen after the "adjustment" button illustrated in FIG. 6A has been touched and the force condition adjusting process has been performed once.

As illustrated in FIG. 6B, the force condition adjusting screen after the adjustment also displays a guidance screen to aid the teacher in taking the next step. For example, in the second embodiment, a guidance display is given, stating exemplarily that "Check the monitor and, if alarm is indicated, perform readjustment from the PP. If any error is indicated, cancel the process."

As illustrated in the exemplary guidance display, the force condition adjusting screen after the adjustment can indicate, for example, a status monitor including "normal", "alarm", and "error". The exemplary status monitor is a lamp-like status monitor that can be turned ON or OFF, which is not the only possible arrangement. The guidance screen and the contents of the status monitor enable the teacher to select the next step to perform.

In addition, the force condition adjusting screen after the adjustment may display, for example, a force waveform based on a measured value of the force sensor 33 as a waveform monitor as illustrated in FIG. 6B. Giving the monitor display, such as the status monitor and the waveform monitor, can aid the teacher in teaching the robot accurately with fewer errors regardless of the degree of skill of the teacher in question.

In addition, the force condition adjusting screen after the performance of the process also displays adjustment results in its lower right area. FIG. 6B illustrates exemplary adjustment results that are "a'", "b'", "c'", "d'", "e'", and "f'" in that order from the top of the viscosity coefficient D (see the closed curve 601 in FIG. 6B) to correspond to the input items, such as the "coordinate system", the "fitting direction", and the "specified value", input earlier.

The teacher operates the programming pendant 40 while referring to the adjustment results to thereby input the adjusted viscosity coefficient D. Then, the teacher operates the "start" button of the programming pendant 40 to thereby cause the robot 30 to perform the operations for the force condition adjusting process.

Thereafter, the teacher touches the "adjustment" button disposed at the lower left area of the force condition adjusting screen to thereby perform the force condition adjusting process again. Then, if the "normal" status monitor is illuminated as illustrated in FIG. 6B, the teacher checks the adjustment results and then touches the "end" button to save the adjustment results in the PC 20. If the status monitor indicates "error", the teacher touches the "cancel" button to thereby cancel the force condition adjusting process.

Specific exemplary operating steps of the operating condition adjusting process according to the second embodiment will be described below. Referring to FIGS. 8A to 10B mentioned earlier, the following describes the second embodiment.

The contact operation will first be described. As illustrated in FIG. 8A, the contact operation adjusting screen includes a guidance screen as in the force condition adjusting screen (FIGS. 6A and 6B).

As illustrated in FIG. 8A, the guidance screen displays guidance messages indicating operating steps, such as "1. Teach fitting start position P1 (several millimeters just above the hole) with the PP." and "2. Teach position P2 (position not in alignment with the hole) several millimeters moved horizontally from P1 with the PP."

The guidance screen can display a guide sketch associated with the guidance messages as illustrated in FIG. 8A.

This allows support to be provided for the teacher to teach the robot accurately with fewer errors regardless of the degree of skill of the teacher in question. The teacher performs operations required for the adjustment of the operating condition parameters 12b relating to the contact operation according to what is displayed on the guidance screen.

For example, the contact operation adjusting screen illustrated in FIG. 8A includes an operation screen in its lower left area. The teacher is to input data in the input items in the operation screen, e.g., a command value, such as the "contact distance". Before the teacher performs the input operation, default values included in the operating condition parameters 12b are displayed in the input items of the operation screen.

The contact operation adjusting screen further includes a monitor display area including a status monitor and a waveform monitor placed in its right-hand side, like in the force condition adjusting screen (see FIG. 6B).

The monitor display area displays a force waveform (see the waveform monitor (force) in FIG. 8A), a status transition waveform (see the waveform monitor (status transitions) in FIG. 8A), and a position waveform (see the waveform monitor (position) in FIG. 8A) obtained by causing the robot 30 to perform the contact operation in the contact operation adjusting process.

The teacher follows the guidance message and operates the PC 20 to thereby input the command value, such as the "contact distance", and the programming pendant 40 to thereby input the command value, such as the "contact distance", thereby teaching the robot 30 the operating modes. When the teacher operates the "start" button of the programming pendant 40, the robot 30 starts to perform the contact operation.

The measured values taken by the force sensor 33 and the position feedback values from the robot 30 (each servomotor) during the contact operation performed by the robot 30 are sent to the controller 10 and recorded in the force condition file 12a. These measured values and the position feedback values from the robot 30 (position sensor of each servomotor) are used for the contact operation adjusting process by the operating condition adjuster 21e of the PC 20.

Thereafter, the teacher touches the "adjustment" button disposed at the lower left area of the contact operation adjusting screen to thereby perform the contact operation adjusting process. FIG. 8B illustrates an exemplary contact operation adjusting screen after the "adjustment" button illustrated in FIG. 8A has been touched and the contact operation adjusting process has been performed once. As illustrated in FIG. 8B, the contact operation adjusting screen after the performance of the process also displays a guidance screen to aid the teacher in taking the next step.

For example, in the second embodiment, a guidance display is given, stating exemplarily that "Check the monitor and, if alarm is indicated, perform readjustment from the PP. If any error is indicated, cancel the process."

Additionally, for example, the guidance screen also displays the contact distance as a measurement result in its lower area (see the closed curve 801 in FIG. 8B). The teacher can check the measured value with this measurement result.

The contact operation adjusting screen after the performance of the process displays, for example, an adjustment result of the command value of, for example, the "contact distance" in its lower left area. To follow the instructions on the guidance screen illustrated in FIG. 8B and given the "alarm" status monitor, the teacher operates the programming pendant 40 to input the command value after the adjustment, so that the teacher can re-teach the robot 30 the contact operation.

When the teacher then operates the "start" button of the programming pendant 40, the robot 30 starts performing the contact operation again. Thereafter, the teacher touches the "adjustment" button disposed in the lower left area of the contact operation adjusting screen to thereby perform the contact operation adjusting process.

If the "normal" status monitor is illuminated as illustrated in FIG. 8B, the teacher checks the waveform monitors and the measurement result and then touches the "end" button to save the adjustment results in the PC 20. If the status monitor indicates "error", the teacher touches the "cancel" button to thereby cancel the contact operation adjusting process.

The following describes the groping operation. As illustrated in FIG. 9A, the groping operation adjusting screen is configured to basically include a screen layout identical to that of the contact operation adjusting screen (FIGS. 8A and 8B).

Specifically, as illustrated in FIG. 9A, the guidance screen displays guidance messages indicating operating steps, such as "1. Teach position P3 several millimeters (within 2 mm) moved horizontally from P1 with the PP." and "2. With the robot moved, touch the adjustment button."

The guidance screen also displays a guide sketch associated with the guidance messages.

This allows support to be provided for the teacher to teach the robot accurately with fewer errors regardless of the degree of skill of the teacher in question. The teacher performs operations required for the adjustment of the operating condition parameters 12b relating to the groping operation according to what is displayed on the guidance screen.

For example, the teacher is to input data in the input items in the operation screen in the lower left area, e.g., the "groping cycle" and the "command value" of position P3. The "groping cycle" or the "command value" input here also represents a type of specified values input by the teacher. Before the teacher performs the input operation, default values included in the operating condition parameters 12b or the current values carried over from the preceding process are displayed in the input items of the operation screen.

The teacher operates the programming pendant 40 (PP) to thereby input, for example, the "groping cycle", thereby teaching the robot 30 the groping operation. When the teacher touches the "start" button of the programming pendant 40, the robot 30 starts to perform the groping operation.

The measured values taken by the force sensor 33 and the position feedback values from the robot 30 (the position sensor of each servomotor) during the groping operation performed by the robot 30 are sent to the controller 10 and recorded in the force condition file 12a. These measured values and the position feedback values from the robot 30 (the position sensor of each servomotor) are used for the groping operation adjusting process by the operating condition adjuster 21e of the PC 20.

Thereafter, the teacher touches the "adjustment" button disposed at the lower left area of the groping operation adjusting screen to thereby perform the groping operation adjusting process. FIG. 9B illustrates an exemplary groping operation adjusting screen after the "adjustment" button illustrated in FIG. 9A is touched and the groping operation adjusting process is performed once. As illustrated in FIG. 9B, the groping operation adjusting screen after the performance of the process also displays a guidance screen to aid the teacher in taking the next step.

In the second embodiment, a guidance display is displayed stating exemplarily that "Check the monitor and, if alarm is indicated, readjust the groping cycle using the PP so that the workpiece properly fits into the hole. If any error is indicated, cancel the process."

The groping operation adjusting screen after the performance of the process displays, for example, an adjustment result of, for example, the "groping cycle" in its lower left area. To follow the instructions on the guidance screen illustrated in FIG. 9B and given the "alarm" status monitor, the teacher operates the programming pendant 40 to input the groping cycle after the adjustment, so that the teacher can re-teach the robot 30 the groping operation.

When the teacher then touches the "start" button of the programming pendant 40, the robot 30 starts performing the groping operation again. Thereafter, the teacher touches the "adjustment" button disposed in the lower left area of the groping operation adjusting screen to thereby perform the groping operation adjusting process.

If the "normal" status monitor is illuminated as illustrated in FIG. 9B, the teacher checks the waveform monitors and the measurement result and then touches the "end" button to save the adjustment results in the PC 20. If the status monitor indicates "error", the teacher touches the "cancel" button to thereby cancel the groping operation adjusting process.

The following describes the insertion operation. As illustrated in FIG. 10A, the insertion operation adjusting screen is configured to basically include a screen layout identical to that of the contact operation adjusting screen (FIGS. 8A and 8B).

Specifically, as illustrated in FIG. 10A, the guidance screen displays guidance messages indicating operating steps, such as "1. Move the robot to position P3 and then touch the adjustment button." and "2. Make sure that the workpiece bottoms and the insertion amount is measured." The guidance screen also displays a guide sketch associated with the guidance messages.

This allows support to be provided for the teacher to teach the robot accurately with fewer errors regardless of the degree of skill of the teacher in question. The teacher performs operations required for the adjustment of the operating condition parameters 12b relating to the insertion operation according to what is displayed on the guidance screen.

For example, the teacher is to input data in the input items in the operation screen in the lower left area, e.g., "threshold value 1", "threshold value 2", the "insertion amount", and the "command value" of position 3. "Threshold value 1", "threshold value 2", or the "command value" input here also represents a type of specified values input by the teacher. Before the teacher performs the input operation, default values included in the operating condition parameters 12b or the current values carried over from the preceding process are displayed in the input items of the operation screen.

The teacher then operates the programming pendant 40 (PP) to input, for example, "threshold value 1", "threshold value 2", the "insertion amount", and the "command value" of position 3 and teaches the robot 30 the insertion operation. When the teacher then touches the "start" button of the programming pendant 40, the robot 30 starts the insertion operation.

The measured values taken by the force sensor 33 and the position feedback values from the robot 30 (the position sensor of each servomotor) during the insertion operation performed by the robot 30 are sent to the controller 10 and recorded in the force condition file 12a. These measured values and the position feedback values from the robot 30 (the position sensor of each servomotor) are used for the insertion operation adjusting process by the operating condition adjuster 21e of the PC 20.

Thereafter, the teacher touches the "adjustment" button disposed at the lower left area of the insertion operation adjusting screen to thereby perform the insertion operation adjusting process. FIG. 10B illustrates an exemplary insertion operation adjusting screen after the "adjustment" button illustrated in FIG. 10A is touched and the insertion operation adjusting process is performed once. As illustrated in FIG. 10B, the insertion operation adjusting screen after the performance of the process also displays a guidance screen to aid the teacher in taking the next step.

For example, in the second embodiment, a guidance display is given, stating exemplarily that "Check the monitor and, if alarm is indicated, readjust threshold values 1 and 2 using the PP so that the insertion amount falls within the ranges of threshold values 1 and 2. If any error is indicated, cancel the process."

The insertion operation adjusting screen after the performance of the process displays in the lower left area, for example, the measured value of the "insertion amount", the "command value", and "threshold 1" and "threshold 2" after the adjustment.

To follow the instructions on the guidance screen illustrated in FIG. 9B and given the "alarm" status monitor, the teacher operates the programming pendant 40 to re-input "threshold value 1" and "threshold value 2", so that the teacher can re-teach the robot 30 the insertion operation.

When the teacher then operates the "start" button of the programming pendant 40, the robot 30 starts performing the insertion operation again. Thereafter, the teacher touches the "adjustment" button disposed in the lower left area of the insertion operation adjusting screen to thereby perform the insertion operation adjusting process.

If the "normal" status monitor is illuminated as illustrated in FIG. 10B, the teacher checks the waveform monitors and the measurement result and then touches the "end" button to save the adjustment results in the PC 20. If the status monitor indicates "error", the teacher touches the "cancel" button to thereby cancel the insertion operation adjusting process.

Figure 13:
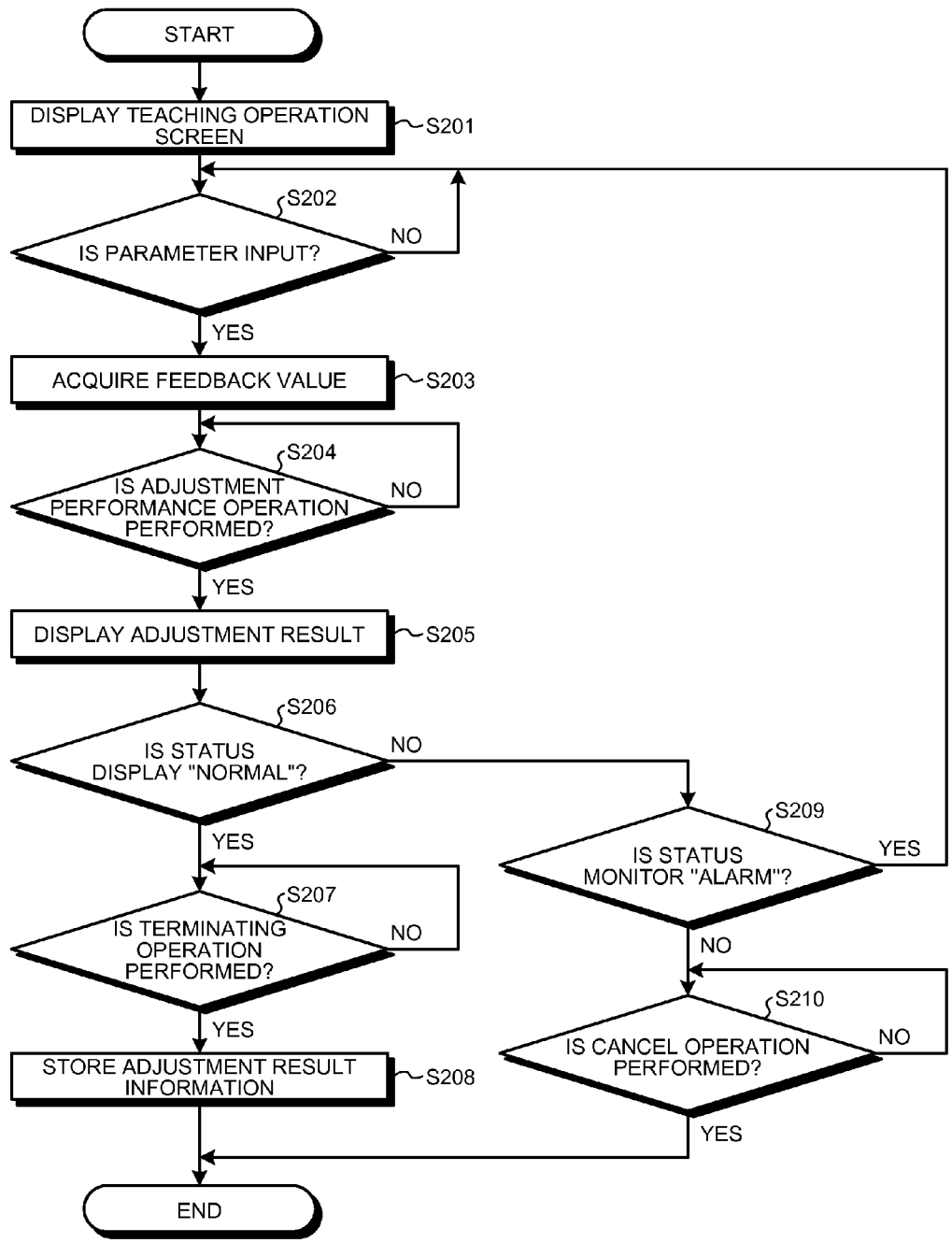
FIG. 13 is a flowchart illustrating processing steps performed by a PC according to the second embodiment.

The following describes processing steps performed by the PC 20 according to the second embodiment with reference to FIG. 13. FIG. 13 is a flowchart illustrating the processing steps performed by the PC 20 according to the second embodiment. The PC 20 is connected to the controller 10 and performs the processing steps illustrated in FIG. 13 when receiving an operation to perform the force condition adjusting process or the operating condition adjusting process by the teacher.

Specifically, as illustrated in FIG. 13, the PC 20 causes the display unit 24 to display the teaching operation screen (Step S201). In this process, the PC 20 causes either one teaching operation screen out of the force condition adjusting screen, the contact operation adjusting screen, the groping operation adjusting screen, and the insertion operation adjusting screen to be displayed according to the operation performed by the teacher.

The PC 20 next determines whether a parameter is input by the teacher (Step S202). If no parameters are input (No at Step S202), the PC 20 repeats the determination step of Step S202 until a parameter is input. When a parameter is input (Yes at Step S202), the PC 20 acquires from the controller 10 a feedback value as a result of the operation of the robot 30 (Step S203).

Then, the PC 20 determines whether an adjustment performance operation is performed (Step S204). If no adjustment performance operations are performed (No at Step S204), the PC 20 repeats the determination step of Step S204 until an adjustment performance operation is performed. If an adjustment performance operation is performed (Yes at Step S204), the PC 20 adjusts the parameter and causes the display unit 24 to display the adjustment result (Step S205).

Then, the PC 20 determines whether the status display is "normal" on the teaching operation screen (Step S206). If the status display is "normal" (Yes at Step S206), the PC 20 determines whether a terminating operation is performed (Step S207). If no terminating operations are performed (No at Step S207), the PC 20 repeats the determination step of Step S207 until a terminating operation is performed. If a terminating operation is performed (Yes at Step S207), the PC 20 stores the adjustment result information 22b (Step S208) and the process is terminated.

If the status monitor is not "normal" at Step S206 (No at Step S206), the PC 20 determines whether the status monitor is "alarm" (Step S209). If the status monitor is "alarm" (Yes at Step S209), the PC 20 performs the step of Step S202.

If the status monitor is not "alarm" (No at Step S209), the PC 20 considers that the status monitor is "error" and determines whether a cancel operation is performed (Step S210). If no cancel operations are performed (No at Step S210), the PC 20 repeats the determination step of Step S210 until a cancel operation is performed. If a cancel operation is performed (Yes at Step S210), the PC 20 terminates the process.

As described heretofore, in the robot teaching system according to the second embodiment, the PC that functions as a robot teaching assistant device includes an operating unit, adjusters, and a screen generator. The operating unit of the PC receives an input operation of a specified value for defining an operation command that includes a correction of an operating mode of the robot based on a measured value of the sensor.

The adjusters of the PC adjusts parameters for correcting the operating mode of the robot based on the input specified value and the measured value of the sensor. The screen generator of the PC generates a teaching operation screen that includes guidance information relating to the input of the parameters to a teaching device that teaches the robot the operating mode.

Thus, in the robot teaching system according to the second embodiment, the teacher can perform efficient and accurate teaching through simple operations regardless of the degree of skill of the teacher by operating the programming pendant according to the guidance information on the teaching operation screen.

Each of the above-described first and second embodiments has been described for an exemplary case in which a job for one complete session of fitting work is generated. The fitting work, however, involves different operating conditions depending on, for example, the type of robot, the type of workpiece, and the posture of the robot. In addition, the operating conditions are considered to vary depending on the work environment involved even with an identical type of fitting work.

This requires each individual teaching session for each of the different operating conditions and starting over the teaching session for each case is inefficient. As another embodiment, a case will be described in which an individual teaching session is shared and used.

Another Embodiment

Figure 14:
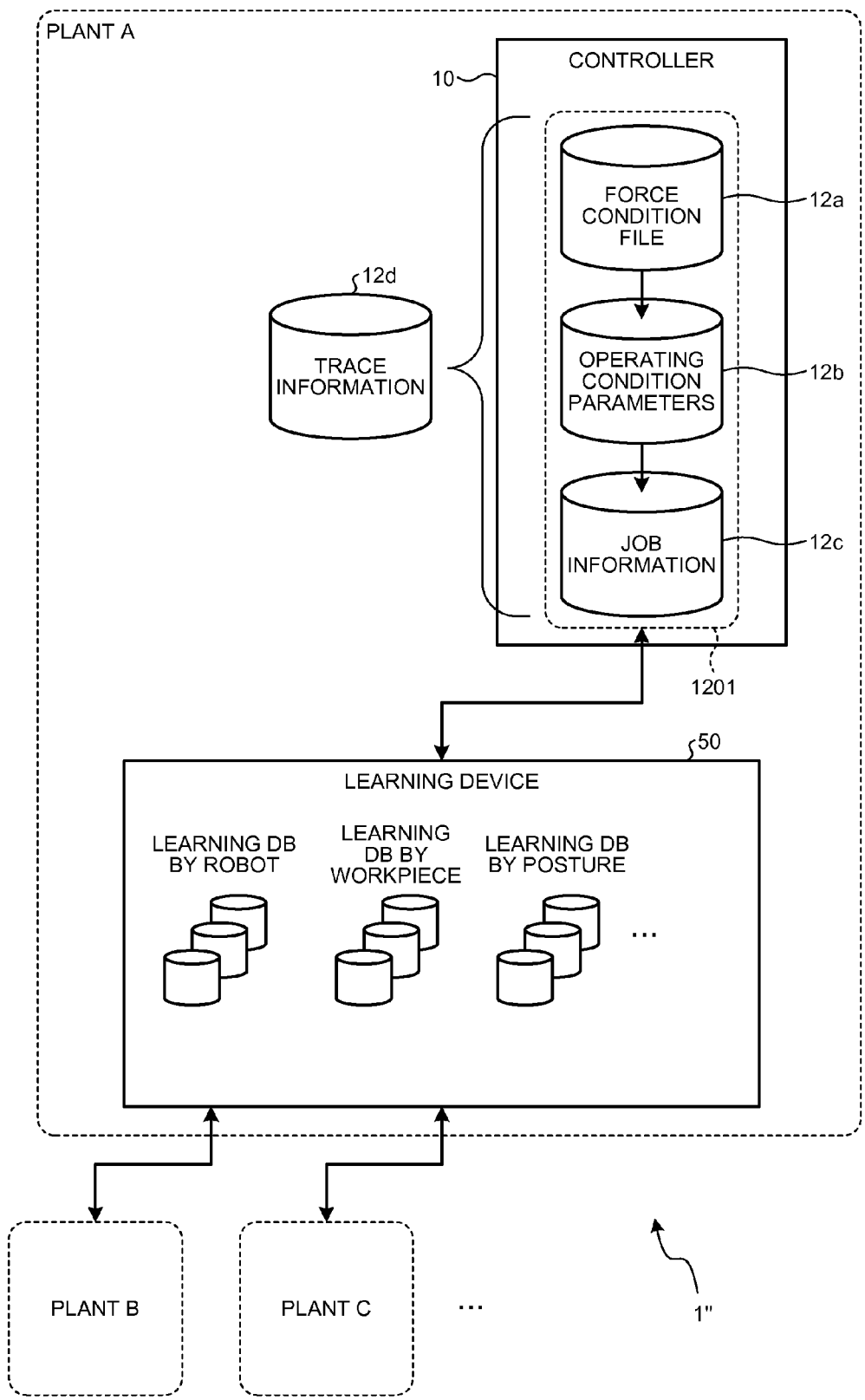
FIG. 14 is a schematic diagram illustrating the configuration of a robot teaching system according to another embodiment.

FIG. 14 is a schematic diagram illustrating the configuration of a robot teaching system 1" according to another embodiment. FIG. 14 schematically illustrates only those elements that are required for describing the robot teaching system 1".

Referring to FIG. 14, the process has already been described in which a force condition file 12a and operating condition parameters 12b of a controller 10 are adjusted in sequence and job information 12c is generated based on the adjustment. A history of this process (see a closed curve 1201 in FIG. 14) may be recorded as trace information 12d.

In such a case, referring to the trace information 12d during the next teaching session enhances efficiency in teaching. With a substantially identical type of fitting work, for example, the teaching can be performed substantially automatically by tracing the trace information 12d without having to make manual input.

For a type of work performed in an identical work environment (e.g., work performed at the same plant), even if it is not an identical type of work, more practical parameters can be fetched from the trace information 12d and used. This contributes to making the teaching more efficient.

Additionally, the robot teaching system 1" may further include a learning device 50 as illustrated in FIG. 14. The learning device 50 makes a systematic database of the force condition file 12a, the operating condition parameters 12b, and the job information 12c adjusted and generated through the teaching performed at the controller 10 and the like.

For example, FIG. 14 illustrates an example in which learning databases (DBs) are compiled systematically according to different categories, specifically, for example, by the robot, by the workpiece, and by the posture. This allows, when performing a single teaching session, those of the force condition file 12a, the operating condition parameters 12b, and the job information 12c that represent conditions close to the current teaching condition to be extracted in advance from the learning DBs of the learning device 50 and used. The current teaching session can thus be performed extremely efficiently.

These learning DBs may, for example, be shared among different plants via a network, as illustrated as plant A, plant B, and plant C in FIG. 14. This approach, for example, eliminates the need for teaching at plant B or plant C what is taught at plant A from the beginning. This contributes greatly to making efficient the robot teaching in a corporate-wide perspective.

FIG. 14 illustrates a configuration that includes the trace information 12d and the learning device 50 separately from the controller 10. The trace information 12d and the learning device 50 may still be included in the controller 10.

Fitting work has been exemplified in each of the above-described embodiments. Any other type of work may be performed as long as the type of work is a predetermined set of work performed in contact with the workpieces.

The type of work may, for example, be a copying operation that profiles the workpiece. Such a copying operation may first be divided into "touch" and "follow" and the operating condition parameters may be adjusted for each of the "touch" and "follow" operations. The type of work may still involve contact only.

In each of the above-described embodiments, the operating unit and the display unit are each configured as an independent unit separated from each other. The operating unit and the display unit may be integrated with each other using, for example, a touch panel that supports multiple touch.

In each of the above-described embodiments, the robot has been exemplified as what is called a humanoid robot having arms. The robot may not necessarily be humanoid.

The above-described controller may be configured with, for example, a computer. In this configuration, the control unit is a central processing unit (CPU) and the storage unit is a memory. Each of the functions of the control unit can be achieved by loading a previously prepared program on the control unit and causing the control unit to execute the program.

Such a program may even be one including a plurality of computer-executable instructions recorded in a non-transitory, computer-readable recording medium and installed in the storage unit of the controller from the recording medium.

Examples of the computer-readable recording media include a hard disk (HD), a flexible disk (FD), a compact disk (CD), a magneto-optical disk (MO), and a memory card.

In addition, in each of the above-described embodiments, the PC and the programming pendant are each configured as an independent unit separated from each other. Functions of the PC may be added to the programming pendant for operating the robot to thereby configure an integrated unit. Alternatively, functions of the programming pendant may even be added to the PC to thereby configure an integrated unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The following discloses additional aspects relating to the above-described embodiments.

(1) A robot teaching system, comprising:
a robot that has an end effector;
a force sensor disposed at the robot, the force sensor measuring measured values of force applied to the end effector;
a screen generator that generates a teaching operation screen that includes guidance information intended for a teacher;
an adjuster that adjusts parameters for generating a job based on specified values of the teacher input in the teaching operation screen and the measured values of the force sensor, the parameters defining an operation command for causing a predetermined type of work to be performed, including corrections of the operations of the robot; and
a job generator that generates the job in which the parameters adjusted by the adjuster are incorporated.

(2) The robot teaching system according to (1) above, wherein
the parameters include force control parameters relating to force control of the robot and operating condition parameters relating to operating conditions of the robot, and
the adjuster comprises a first adjuster that adjusts the force control parameters and a second adjuster that adjusts the operating condition parameters.

(3) The robot teaching system of (2) above, wherein, with the predetermined type of work divided into a plurality of operations performed by the robot, the second adjuster adjusts the operating condition parameters in the operations.

(4) The robot teaching system according to (3) above, wherein
the predetermined type of work comprises fitting work in which a first workpiece is fitted into a second workpiece, and
with the fitting work divided into a contact operation that causes the first workpiece to touch the second workpiece, a groping operation that causes the first workpiece to grope for a shape of the second workpiece, and an insertion operation that causes the first workpiece to be inserted into the second workpiece, the second adjuster adjusts the operating condition parameters in the contact operation, the groping operation, and the insertion operation.

(5) The robot teaching system according to (4) above, wherein the second adjuster adjusts the operating condition parameters individually in each of the contact operation, the groping operation, and the insertion operation.

(6) The robot teaching system according to (4) above, wherein the second adjuster adjusts the operating condition parameters continuously, while carrying over the operating condition parameters in sequence from the contact operation to the groping operation and from the groping operation to the insertion operation.

(7) The robot teaching system according to any one of (1) to (6) above, wherein the screen generator generates the teaching operation screen that includes a guidance message indicating an operating step of the teacher and a guide sketch associated with specific contents of the guidance message as the guidance information.

(8) The robot teaching system according to any one of (1) to (7) above, wherein when the adjuster has adjusted the parameters, the screen generator generates the teaching operation screen that includes a status monitor indicating a condition of the adjustment and a waveform monitor based on the measured values of the force sensor.

(9) A robot teaching method, comprising:
measuring measured values of force applied to an end effector of a robot;
generating a teaching operation screen that includes guidance information intended for a teacher;
adjusting parameters for generating a job based on specified values of the teacher input in the teaching operation screen and the measured values, the parameters defining an operation command for causing a predetermined type of work to be performed, including corrections of the operations of the robot; and
generating the job in which the adjusted parameters are incorporated.

(10) A robot teaching assistant device, comprising:
an operating unit that receives an input operation of specified values for defining an operating instruction including corrections of an operating mode of a robot based on measured values of a sensor;
an adjuster that adjusts parameters that correct the operating mode of the robot based on the input specified values and the measured values of the sensor; and
a screen generator that generates a teaching operation screen that includes guidance information relating to an input of the parameters to a teaching device that teaches the robot the operating mode.

(11) The robot teaching assistant device according to (10) above, wherein the sensor is a force sensor that measures force applied to the robot.

(12) The robot teaching assistant device according to (10) or (11) above, wherein
the robot has an end effector for use in work, and
the sensor is a force sensor that measures force applied to the end effector.

(13) The robot teaching assistant device according to (11) or (12) above, wherein
the parameters include force control parameters relating to force control of the robot and operating condition parameters relating to operating conditions of the robot, and
the adjuster comprises a first adjuster that adjusts the force control parameters and a second adjuster that adjusts the operating condition parameters.

(14) The robot teaching assistant device according to (13) above, wherein, with the operating mode divided into a plurality of operations performed by the robot, the second adjuster adjusts the operating condition parameters in the operations.

(15) The robot teaching assistant device according to (14) above, wherein
work performed by the operating mode comprises fitting work in which a first workpiece is fitted into a second workpiece, and with the fitting work divided into a contact operation that causes the first workpiece to touch the second workpiece, a groping operation that causes the first workpiece to grope for a shape of the second workpiece, and an insertion operation that causes the first workpiece to be inserted into the second workpiece, the second adjuster adjusts the operating condition parameters in the contact operation, the groping operation, and the insertion operation.

(16) The robot teaching assistant device according to (15) above, wherein the second adjuster adjusts the operating condition parameters individually in each of the contact operation, the groping operation, and the insertion operation.

(17) The robot teaching assistant device according to any one of (10) to (16) above, wherein the screen generator generates the teaching operation screen that includes a guidance message indicating an operating step of the teaching device and a guide sketch associated with specific contents of the guidance message as the guidance information.

(18) The robot teaching assistant device according to any one of (10) to (17) above, wherein when the adjuster has adjusted the parameters, the screen generator generates the teaching operation screen that includes a status monitor indicating a condition of the adjustment and a waveform monitor based on the measured values of the force sensor.

(19) A robot system, comprising:
a robot;
a teaching device that teaches the robot an operating mode; and
a robot teaching assistant device that assists in teaching by the teaching device, wherein
the robot teaching assistant device comprises:
an operating unit that receives an input operation of specified values for defining an operating instruction including corrections of the operating mode of the robot based on measured values of a sensor;
an adjuster that adjusts parameters that correct the operating mode of the robot based on the input specified values and the measured values of the sensor; and
a screen generator that generates a teaching operation screen that includes guidance information relating to an input of the parameters to the teaching device.

(20) A robot teaching method, comprising:
receiving, with an operating unit, an input operation of specified values for defining an operating instruction including corrections of an operating mode of a robot based on measured values of a sensor;
adjusting, with an adjuster, parameters that correct the operating mode of the robot based on the input specified values and the measured values of the sensor; and
generating, with a screen generator, a teaching operation screen that includes guidance information relating to an input of the parameters to a teaching device that teaches the robot the operating mode.

What is claimed is:
1. A robot teaching system, comprising:
a robot;
a sensor that measures measured values relating to operations of the robot;
a screen generator that generates a teaching operation screen that includes guidance information intended for a teacher;
an adjuster that adjusts parameters for generating a job based on specified values relating to the operations of the robot and input in the teaching operation screen, and the measured values of the sensor associated with the specified values, the parameters defining an operation command including corrections of the operations of the robot; and
a job generator that generates the job in which the parameters adjusted by the adjuster are incorporated.

2. The robot teaching system according to claim 1, wherein the sensor includes a force sensor that measures force applied to an end effector of the robot.

3. The robot teaching system according to claim 2, wherein the parameters include force control parameters relating to force control of the robot and operating condition parameters relating to operating conditions of the robot, and
the adjuster comprises a first adjuster that adjusts the force control parameters and a second adjuster that adjusts the operating condition parameters.

4. The robot teaching system according to claim 3, wherein, with a predetermined type of work divided into a plurality of operations performed by the robot, the second adjuster adjusts the operating condition parameters in the operations.

5. The robot teaching system according to claim 4, wherein the predetermined type of work includes fitting work in which a first workpiece is fitted into a second workpiece, and
with the fitting work divided into a contact operation that causes the first workpiece to touch the second workpiece, a groping operation that causes the first workpiece to grope for a shape of the second workpiece, and an insertion operation that causes the first workpiece to be inserted into the second workpiece, the second adjuster adjusts the operating condition parameters in the contact operation, the groping operation, and the insertion operation.

6. The robot teaching system according to claim 5, wherein the second adjuster adjusts the operating condition parameters individually in each of the contact operation, the groping operation, and the insertion operation.

7. The robot teaching system according to claim 5, wherein the second adjuster adjusts the operating condition parameters continuously, while carrying over the operating condition parameters in sequence from the contact operation to the groping operation and from the groping operation to the insertion operation.

8. The robot teaching system according to claim 1, wherein the screen generator generates the teaching operation screen that includes a guidance message indicating an operating step of the teacher and a guide sketch associated with specific contents of the guidance message as the guidance information.

9. The robot teaching system according to claim 1, wherein, when the adjuster has adjusted the parameters, the screen generator generates the teaching operation screen that includes a status monitor indicating a condition of the adjustment and a waveform monitor based on the measured values of the force sensor.

10. A robot teaching assistant device that corrects an operating mode of a robot based on measured values of a sensor, the robot teaching assistant device comprising:
an operating unit that receives an input operation of specified values for defining an operation command;
an adjuster that adjusts parameters that correct the operating mode of the robot based on the input specified values and the measured values of the sensor associated with the specified values; and
a screen generator that generates a teaching operation screen that includes guidance information relating to an input of the parameters to a teaching device that teaches the robot the operating mode.

11. The robot teaching assistant device according to claim 10, wherein the sensor includes a force sensor that measures force applied to an end effector of the robot.

12. The robot teaching assistant device according to claim 11, wherein
the parameters include force control parameters relating to force control of the robot and operating condition parameters relating to operating conditions of the robot, and
the adjuster comprises a first adjuster that adjusts the force control parameters and a second adjuster that adjusts the operating condition parameters.

13. A robot teaching method, comprising:
generating a teaching operation screen that includes guidance information intended for a teacher;
inputting specified values relating to operations of a robot via the teaching operation screen;
measuring measured values relating to the operations of the robot and associated with the specified values;
adjusting parameters for generating a job based on the specified values and the measured values, the parameters defining an operation command including corrections of the operations of the robot; and
generating the job in which the adjusted parameters are incorporated.

14. The robot teaching method according to claim 13, wherein the measuring of the measured values includes measuring force applied to an end effector of the robot.

15. The robot teaching method according to claim 14, wherein the adjusting of the parameters includes adjusting force control parameters relating to force control of the robot and adjusting operating condition parameters relating to operating conditions of the robot.

16. A non-transitory computer-readable medium storing instructions executable by a computer, wherein the instructions cause the computer to perform:
generating a teaching operation screen that includes guidance information intended for a teacher;
inputting specified values relating to operations of a robot via the teaching operation screen;
measuring measured values relating to the operations of the robot and associated with the specified values;
adjusting parameters for generating a job based on the specified values and the measured values, the parameters defining an operation command including corrections of the operations of the robot; and
generating the job in which the adjusted parameters are incorporated.

17. The computer-readable recording medium according to claim 16, wherein the measuring of the measured values includes measuring force applied to an end effector of the robot.

18. The computer-readable recording medium according to claim 17, wherein the adjusting of the parameters includes adjusting force control parameters relating to force control of the robot and adjusting operating condition parameters relating to operating conditions of the robot.

19. A robot teaching system, comprising:
a measuring means for measuring measured values relating to operations of a robot;
a screen generating means for generating a teaching operation screen that includes guidance information intended for a teacher;
an adjusting means for adjusting parameters for generating a job based on specified values relating to the operations of the robot and input in the teaching operation screen, and the measured values of a sensor associated with the specified values, the parameters defining an operation command including corrections of the operations of the robot; and
a job generating means for generating the job in which the parameters adjusted by the means for adjusting are incorporated.

\* \* \* \* \*